(12) United States Patent
Moriura et al.

(10) Patent No.: US 7,034,961 B2
(45) Date of Patent: Apr. 25, 2006

(54) IMAGE FORMING APPARATUS

(75) Inventors: Kenji Moriura, Ebina (JP); Hirotaka Mori, Ebina (JP); Nobuyuki Kodera, Ebina (JP); Motohiro Takashima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 866 days.

(21) Appl. No.: 09/968,758

(22) Filed: Oct. 3, 2001

(65) Prior Publication Data
US 2002/0041384 A1    Apr. 11, 2002

(30) Foreign Application Priority Data
Oct. 6, 2000    (JP)    ............................ P2000-307075

(51) Int. Cl.
*G06F 15/00*    (2006.01)

(52) U.S. Cl. ...................... 358/1.9; 358/1.16; 358/1.17; 358/523; 358/444; 358/515; 358/1.1; 358/530; 358/518; 382/167; 345/604

(58) Field of Classification Search ................ 358/1.9, 358/1.16, 1.15, 1.17, 523, 444, 515, 1.2, 358/404, 1.6, 1.1, 518, 530; 345/604; 347/116, 347/171; 400/76; 382/167; 711/202
See application file for complete search history.

(56) References Cited

U.S. PATENT DOCUMENTS

| 4,931,815 | A | * | 6/1990 | Sato et al. .................. 347/1.16 |
| 5,057,914 | A | * | 10/1991 | Tsuji et al. .................. 358/530 |
| 5,485,283 | A | * | 1/1996 | Kaneko ....................... 358/518 |
| 5,719,956 | A | * | 2/1998 | Ogatsu et al. ............... 382/167 |
| 5,798,843 | A | * | 8/1998 | Yamamoto et al. ......... 358/404 |
| 5,821,969 | A | * | 10/1998 | Koshi et al. ................. 347/116 |
| 5,838,883 | A | * | 11/1998 | Pekelman .................... 358/1.6 |
| 5,937,152 | A | * | 8/1999 | Oda et al. .................... 358/1.16 |
| 6,009,245 | A | * | 12/1999 | Kato et al. ................... 358/1.17 |
| 6,111,656 | A | * | 8/2000 | Nohata et al. ............... 358/1.2 |
| 6,188,422 | B1 | * | 2/2001 | Ogura ......................... 347/171 |
| 6,261,010 | B1 | * | 7/2001 | Maeda ......................... 400/76 |
| 6,486,966 | B1 | * | 11/2002 | Takahashi et al. ........... 358/1.1 |
| 6,564,310 | B1 | * | 5/2003 | Nakata et al. ............... 711/202 |

\* cited by examiner

*Primary Examiner*—Kimberly Williams
*Assistant Examiner*—Beniyam Menberu
(74) *Attorney, Agent, or Firm*—Oliff & Berridge, PLC

(57) ABSTRACT

Buffers of YMCK colors have memory capacities for storing image data corresponding to a difference between timings at which YMCK images formed on YMCK photosensitive drums are transferred onto a transfer member and control is effected such that paper is fed only when all image data sets to be printed are stored in the respective YMCK buffers.

23 Claims, 14 Drawing Sheets

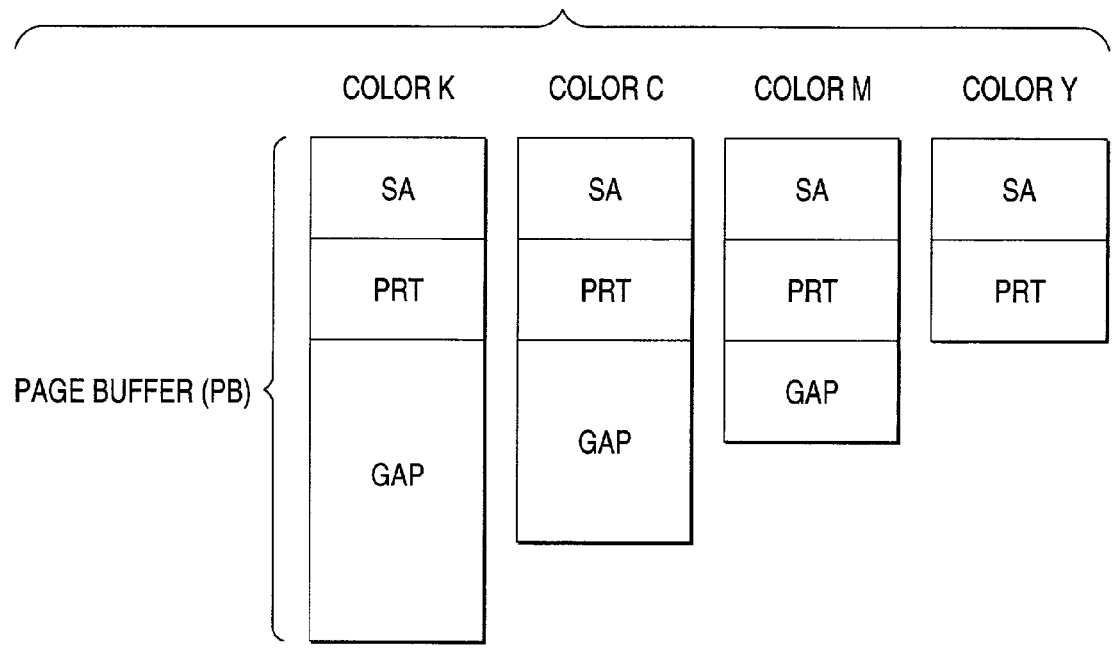
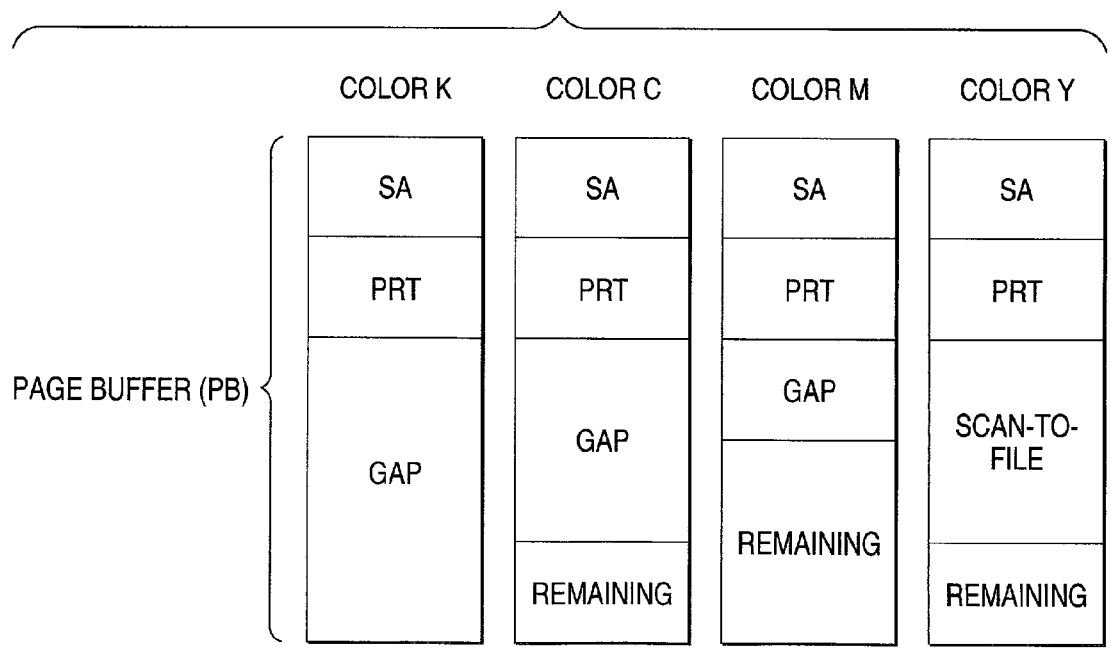

IMAGE FORMING APPARATUS

BACKGROUND OF THE INVENTION

1. Field of the Invention

The present invention relates to an image forming apparatus, and more particularly, to an image forming apparatus capable of preventing copy failures from occurring without increasing the memory capacity of a page buffer more than required and capable of efficiently producing an image.

2. Description of the Related Art

According to related art, in an image forming apparatus of this type, in order to absorb difference between time to transfer an image data from a hard disk (hereinafter, simply called an "HDD") and time to print out the image data, one page of the image data to be printed first is transferred to a page buffer, for example, by an electronic sort and after required edit-process, such as image rotating, is performed on the image data, the image data is printed out.

Whereas, normally, since the HDD of this type cannot insure against certainly reading data within a predetermined period due to configuration, reading takes a long time due to a read error.

In this way, in the related art, if the reading takes a long time due to the reading error and the like, the image data miss timing when being printed on a paper. Thus, any of the four colors, YMCK, is lost and there is possibility to output a erroneously-printed paper.

If an amount of data stored in the page buffer is increased to absorb elapse of transfer time due to the error, the above problem can be avoided. However, since high-speed DRAM (dynamic RAM) and the like is usually used for the page buffer, if the capacity of the page buffer is increased in vain, the printing apparatus becomes extremely expensive.

SUMMARY OF THE INVENTION

As mentioned above, in the image forming apparatus according to the related art, if it takes a long time to read image data from a storage device, such as a hard disk, to a page buffer, the image data miss timing when being printed on a paper. Thus, any of the four colors, YMCK, is lost and there is possibility to output a erroneously-printed paper.

Since the page buffer of this type is very expensive, the storage capacity of the pager buffer cannot be increased in vain.

An object of the present invention is to solve the foregoing problem and to provide an image forming apparatus enabling to prevent a defective copy from occurring without increasing the memory capacity of the page buffer more than necessary, the image forming apparatus having effective productivity.

To achieve the object, according to a first aspect of the invention, there is provided an image forming apparatus comprising: a first storage section adapted to store image data of a plurality of colors constructing a predetermined color space, respectively; a plurality of second storage sections corresponding to the plurality of colors, respectively, and having different capacities from each other; and a plurality of image forming sections corresponding to the plurality of colors, respectively and having different image forming positions from each other, wherein the image data of each of colors is read from the first storage section to each of second storage sections; and the plurality of image forming sections form an image on a sheet based on the image data read to the second storage regions, respectively.

According to such configuration, the capacity of each of the second storage sections (page buffers) can be minimized. A copy failure can be prevented from occurring.

According to a second aspect of the invention, there is provided the image forming apparatus according to the first aspect of the invention, wherein the second storage sections comprise the first regions adapted to store the image data of the plurality of colors read from the first storage section, respectively; the first region corresponding to one of the colors has the minimum capacity of the first regions; and the first regions corresponding to the others of the colors have different capacities from each other in accordance with differences between an image forming timing corresponding to the one of the colors and image forming timings corresponding to the others of the colors due to differences in the image forming positions, respectively.

According to such configuration, in consideration of costs, the copy failure is prevented from occurring without increasing the capacities of the second storage sections (page buffers) unnecessarily. Thus, it can be realized to form the image efficiently.

More specifically, even if it takes a long time to read the image data from the first storage section (a storage device such as a hard disk or the like) to the second storage sections (the page buffers) due to a read error or the like, it can be ensured with the minimum capacity that the image data of all colors are stored in the page buffers at a timing when the sheet (paper) is fed. Accordingly, it can be prevented that preparation of the image data (print data) for the image formation lags to generate copy failures such as discharge of a paper erroneously formed (printed) the image or discharge of unwanted white paper.

According to a third aspect of the invention, there is provided the image forming apparatus according to the second aspect of the invention, wherein the second storage sections further comprise second regions adapted to store the image data read from the first storage section, respectively; and each of second regions has capacity enabling to store at least a predetermined amount.

According to a fourth aspect of the invention, there is provided the image forming apparatus according to the third aspect of the invention, wherein the predetermined amount is an amount of image data corresponding to one page of the maximum size of the image formed by the image forming sections.

According to such a configuration, the capacities of the second storage sections (the page buffers) can be minimized (in case of single-sided printing).

According to a fifth aspect of the invention, there is provided the image forming apparatus according to the third aspect of the invention, wherein the predetermined amount is an amount of image data corresponding to two pages of the maximum size of the image formed by the image forming sections.

According to a sixth aspect of the invention, there is provided the image forming apparatus according the third aspect of the invention, wherein the predetermined amount is sum of an amount of image data corresponding to a front surface of a sheet and an amount of image data corresponding to a back surface of the sheet in case of double-sided printing.

According to this configuration, the second regions have the capacity enabling to store at least two pages of the maximum size of the image formed by the image forming sections and, for example, the image data of the front surface of the sheet and the image data of the back surface of the sheet in case of forming the image on both surfaces are stored, and whereby even if the hard disk can not be used for some reason, the page buffers store at least two page, that is, the front and back surfaces, of compressed data, thereby certainly ensuring the image formation on both surfaces.

According to a seventh aspect of the invention, there is provided the image forming apparatus according to the fourth aspect of the invention, further comprising an image reading section adapted to read an original to acquire the image data of the plurality of colors, wherein the image data of each of colors acquired by the image reading section are stored in the first storage section through each of second storage sections, respectively; each of second storage sections further comprises a third region adapted to store the image data of each of colors acquired by the image reading section; and each of the third regions has a capacity enabling to store at least another predetermined amount.

According to this configuration, the image data acquired by the image reading sections are stored in the first storage section through the second storage sections corresponding to the plurality of colors and that the capacities of the second storage sections corresponding to the plurality of colors are capacities enabling to store another predetermined amount.

The image reading section can read an image (the original) during an image is formed (printed) from the image data read from the first storage section (a storage device such as the hard disk or the like) (i.e., a scan ahead function can be realized).

According to an eighth aspect of the invention, there is provided the image forming apparatus according to the seventh aspect of the invention, wherein the another predetermined amount is an amount of image data corresponding to one page.

According to an ninth aspect of the invention, there is provided an image forming apparatus comprising: a first storage section adapted to store image data of a plurality of colors constructing a predetermined color space, respectively; a plurality of second storage sections corresponding to the plurality of colors and having the same capacity, respectively; and a plurality of image forming sections corresponding to the plurality of colors and having different image forming positions from each other, respectively, wherein the image data of each of colors is read from the first storage section to each of second storage sections; the plurality of image forming sections form an image on a sheet based on the image data read to the second storage regions, respectively; the second storage sections have first regions adapted to store the image data of the plurality of colors read from the first storage section, respectively; the first region corresponding to one of the colors has the minimum capacity of the first regions; and the first regions corresponding to the others of the colors have different capacities from each other in accordance with differences between an image forming timing corresponding to the one of the colors and image forming timings corresponding to the others of the colors due to differences in the image forming positions, respectively.

According to this configuration, in consideration of costs, the copy failure is prevented from occurring without increasing the capacities of the second storage sections (page buffers) unnecessarily. Thus, it can be realized to form the image efficiently. Furthermore, the second storage sections (the page buffers) corresponding to the plurality of colors have the same capacity, which is the minimum capacity, and whereby management cost on manufacturing can be reduced remarkably in comparison with a case of using second storage sections (print buffers) having different capacities from colors.

According to a tenth aspect of the invention, there is provided the image forming apparatus according to the ninth aspect of the invention, wherein remaining capacity of the second storage section including the first region corresponding to the one of the colors and having the minimum capacity is used for another application.

According to a eleventh aspect of the invention, there is provided the image forming apparatus according to the tenth aspect of the invention, further comprising: an image reading section adapted to read an original to acquire the image data of the plurality of colors; and a communication section adapted to transmit the image data of the plurality of colors acquired by the image reading section through a network, wherein the another application is at least one of storing the image data acquired by the image reading section until the image data acquired by the image reading section are transmitted by the communication section and storing the image data read from the first storage section.

According to these configurations, the remaining capacity of the second storage section (page buffer) can be utilized for the another application effectively. For instance, the image data acquired by the image reading section can be transmitted by way of a network.

According to a twelfth aspect of the invention, there is provided the image forming apparatus according to the tenth aspect of the invention, further comprising: an image reading section adapted to read an original to acquire the image data of the plurality of colors; and a communication section adapted to transmit the image data of the plurality of colors acquired by the image reading section through a network, wherein the first storage sections store the image data acquired by the image reading section until the image data acquired by the image reading section are transmitted by the communication section.

According to an thirteenth aspect of the invention, there is provided the image forming apparatus according to the ninth aspect of the invention, wherein the second storage sections further comprise second regions having capacities enabling to store at least a predetermined amount, respectively.

According to a fourteenth aspect of the invention, there is provided the image forming apparatus according the thirteenth aspect of the invention, wherein the predetermined amount is an amount of image data corresponding to one page of the maximum size of the image formed by the image forming sections.

According to this configuration, the capacities of the second storage sections (the page buffers) can be minimized.

According to a fifteenth aspect of the invention, there is provided the image forming apparatus according to the thirteenth aspect of the invention, wherein the predetermined amount is an amount of image data corresponding to two pages of the maximum size of the image formed by the image forming sections.

According to this configuration, the second regions have the capacity enabling to store at least two pages of the maximum size of the image formed by the image forming sections and, for example, the image data of the front surface of the sheet and the image data of the back surface of the sheet in case of forming the image on both surfaces are stored, and whereby even if the hard disk can not be used for some reason, the page buffers store at least two page, that is, the front and back surfaces, of compressed data, thereby certainly ensuring the image formation on both surfaces.

According to a sixteenth aspect of the invention, there is provided an image forming apparatus comprising: a first storage section adapted to store image data of a plurality of colors constructing a predetermined color space, respectively; a plurality of second storage sections corresponding to the plurality of colors, respectively; a plurality of image forming sections corresponding to the plurality of colors and having different image forming positions from each other; and a print control section adapted to control each of second storage sections to store a predetermined amount of the image data of each of colors and control each of image forming section to start forming an image thereafter, wherein the image data of each of colors is read from the first storage section to each of second storage sections; and the plurality of image forming sections form the image on a sheet based on the image data read to the second storage regions, respectively.

According to a seventeenth aspect of the invention, there is provided the image forming apparatus according to the sixteenth aspect of the invention, wherein the predetermined amount corresponds to a time from a time when the sheet is fed to a time when the image to be formed on the sheet is formed on the sheet.

According to this configuration, certain control is performed with the minimum capacity.

According to a eighteenth aspect of the invention, there is provided the image forming apparatus according to the sixteenth aspect of the invention, wherein the predetermined amount changes in accordance with a print type and an output mode depending on presence of an optional device.

According to this configuration, in consideration of costs, the copy failure is prevented from occurring without increasing the capacities of the second storage sections (page buffers) unnecessarily. Thus, it can be realized to form the image efficiently.

According to a nineteenth aspect of the invention, there is provided an image forming apparatus comprising: a first storage section adapted to store image data of a plurality of colors constructing a predetermined color space, respectively; a plurality of second storage sections corresponding to the plurality of colors to which the image data of the plurality of colors are read from the first storage section, respectively; a plurality of image forming sections corresponding to the plurality of colors and having different image forming positions from each other; a plurality of detecting sections adapted to detect amounts of the image data stored in the second storage sections, respectively; and a paper feeding stop section adapted to stop paper feeding of a sheet when at least one of the amounts of the image data detected by the detecting section falls below a predetermined amount, wherein the plurality of image forming sections form an image on the sheet based on the image data read to the second storage regions, respectively.

According to a twentieth aspect of the invention, the image forming apparatus according to the nineteenth aspect of the invention, further comprises a plurality of count sections; and a notifying section, wherein when at least one of the amounts of the image data stored in the second storage sections falls below a monitoring amount larger than the predetermined amount, the count sections count the number of times of reading the image data of which amount falls below the monitoring amount to the second storage sections; and when the number of times of reading counted by the count sections exceeds a predetermined number of times, the notifying section notifies the number of the times of reading to a management center through a communication circuit in accordance with the number of times of reading.

According to a twenty-first aspect of the invention, there is provided the image forming apparatus according to the nineteenth aspect of the invention, wherein the predetermined amount is an amount of image data corresponding to one page of the maximum size of the image formed by the image forming sections.

According to a twenty-second aspect of the invention, there is provided the image forming apparatus according the nineteenth aspect of the invention, wherein the predetermined amount is an amount of image data to be printed on the sheet which has already been fed.

According to a twenty-third aspect of the invention, there is provided the image forming apparatus according to the nineteenth aspect of the invention, wherein the predetermined amount changes in accordance with a print type and a output mode depending on presence of an optional device.

According to a twenty-fourth aspect of the invention, there is provided the image forming apparatus according to any one of the first, sixteenth, and nineteenth aspects of the invention, wherein the color space is constituted of at least four colors, YMCK; and the plurality of image forming sections make up a quartet tandem type of image forming section having different image forming positions from each other in correspondence with the four colors.

According to these configurations, in consideration of costs, the copy failure is prevented from occurring without increasing the capacities of the second storage sections (page buffers) unnecessarily. Thus, it can be realized to form the image efficiently. Even if it takes a long time to read the image data from the first storage section (a storage device such as a hard disk or the like) to the second storage sections (the page buffers) due to the read error or the like, it can be ensured with the minimum capacity that the image data of all colors are stored in the page buffers at a timing when the sheet (paper) is fed. Accordingly, it can be prevented that preparation of the image data (print data) for the image formation lags to generate copy failures such as discharge of a paper erroneously formed (printed) the image or discharge of unwanted white paper.

BRIEF DESCRIPTION OF THE DRAWINGS

FIG. 11 is a diagram showing a configuration example of the page buffer of the electronic pre-collation (EPC) of each color shown in FIG. 3.

FIG. 12 is a diagram showing a configuration example of the page buffer of the electronic pre-collation (EPC) of each color shown in FIG. 3.

DETAILED DESCRIPTION OF THE PREFERRED EMBODIMENTS

Hereinafter, an embodiment of the invention is described in detail by referring to the accompanying drawings.

Figure 1:
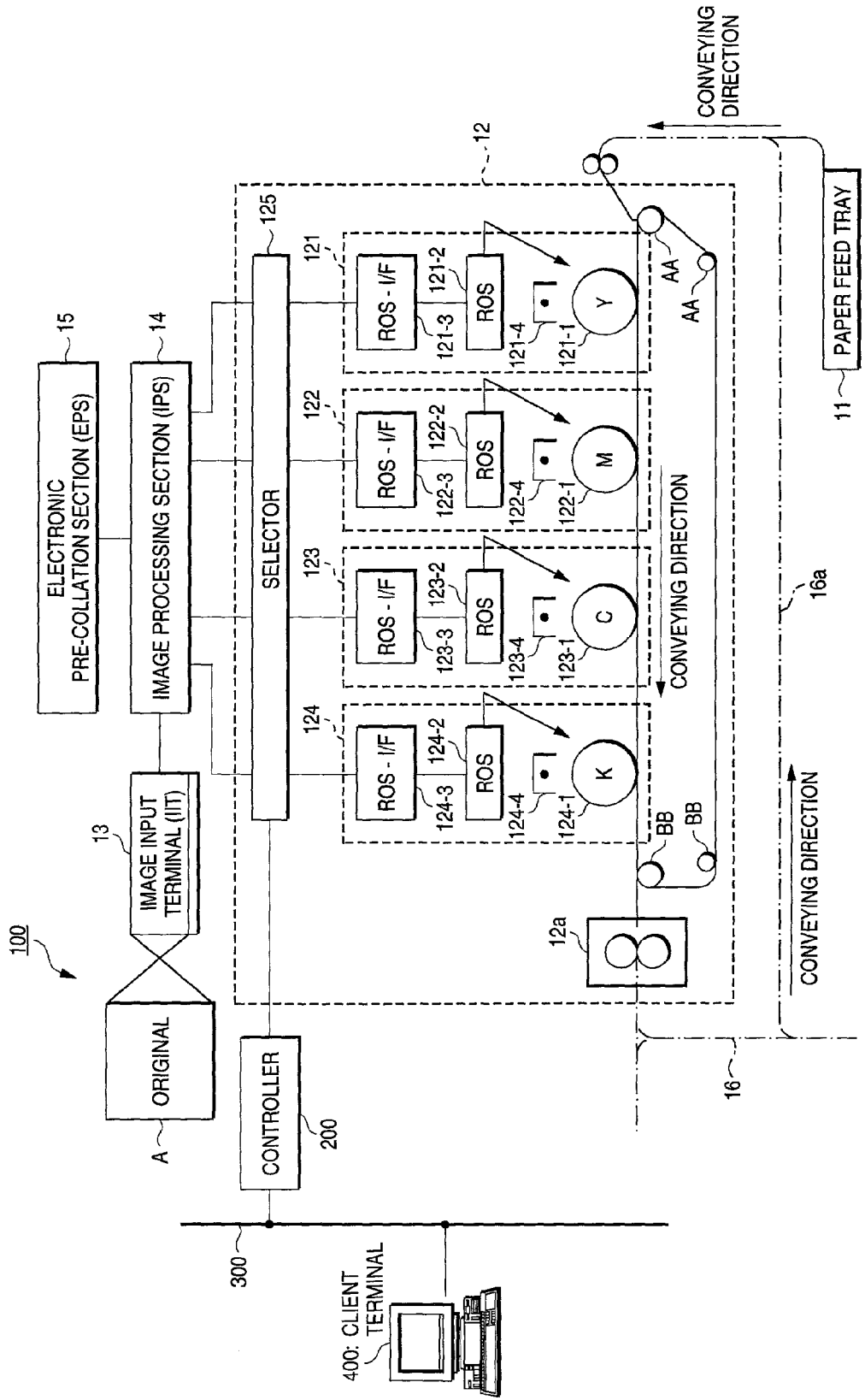
FIG. 1 is a diagram showing an configuration example of an image forming system to which a tandem color image forming apparatus according to the present invention is applied.

FIG. 1 is a diagram illustrating configuration of an image forming system to which a tandem color image forming apparatus 100 according to the invention is applied.

As shown in FIG. 1, the tandem color image forming apparatus 100 of the image forming system comprises a paper feed tray 11 adapted to accommodate printing paper, an image output terminal (hereunder referred to simply as "IOT") 12 for forming images corresponding to four colors, respectively, that is, Cyan (C), Magenta (M), Yellow (Y), and Black (B) on the fed paper, an image input terminal (hereunder referred to simply as "IIT") 13 for reading image data from an original A, an image processing system (hereunder referred to simply as "IPS") 14 for performing predetermined image processing (for instance, color space conversion processing, color correction processing, edit processing, resolution conversion processing, rotation processing, and compression/expansion processing) on the image data from the IIT 13, an electronic pre-collation portion (hereunder referred to simply as "EPC") 15 for sorting print image data, and a paper conveying path 16 for supplying paper to the IOT 12 and for conveying paper to be used for duplex printing and multiple printing. Incidentally, two sets of conveying rollers AA and BB are provided in a double side path portion 16a of the paper conveying path 16 in such a way as to be arranged along conveying direction of a paper 1.

The IOT 12 has a fixing portion 12a for applying heat and pressure to the paper 1 and for fixing a toner image on this paper 1.

The paper conveying path 16 has the double side path portion 16a for conveying the paper 1, on which an image is formed at the IOT 12, to the IOT 12 again so as to perform the duplex printing and the multiple printing.

Further, the IOT 12 has image forming units, which correspond to the colors Y, M, C, and K, respectively. That is, a yellow image forming unit 121 for forming a yellow (Y) image, a magenta image forming unit 122 for forming a magenta (M) image, a cyan image forming unit 123 for forming a cyan (C) image, and a black image forming unit 124 for forming a black (K) image. These four image forming units 121 to 124 are disposed at uniform intervals in a horizontal direction.

Furthermore, these four image forming units 121 to 124 are constructed in such a way as to be of the same configuration. In these image forming units, a yellow toner image, a magenta toner image, a cyan toner image, and a black toner image are formed in sequence.

The image forming units 121 to 124 have photosensitive drums 121-1 to 124-1, respectively. Surfaces of the photosensitive drums 121-1 to 124-1 are uniformly charged by a scorotron, which serves as a primary charger. Thereafter, the surfaces of the photosensitive drums 121-1 to 124-1 are scanned and exposed with laser light beams, which are used for image formation, by image exposing devices (namely, raster output scanning devices (ROSs)) 121-2 to 124-2 according to image data transferred from the IPS 14 through ROS-I/Fs 121-3 to 124-3 and the selector 125. Thus, electrostatic latent images are formed thereon.

Then, the electrostatic latent images formed on the surfaces of the photosensitive drums 121-1 to 124-1 are developed by developing devices 121-4 to 124-4 of the image forming units 121 to 124, which use yellow, magenta, cyan and black toners, respectively, so that visible toner images are formed. Subsequently, these visible toner images are transferred onto the paper of a transfer member, which is supplied by a conveying belt, in such a manner as to be superimposed on each other.

Thereafter, the color toner images transferred onto the transfer paper by multiple transfer undergo fixing performed by fixing devices 12a. Thus, a color image is formed.

Moreover, this tandem color image forming apparatus 100 has function for communicating with a client terminal (namely, a personal computer (PC)) 400 connected to a network 300 (for example, a LAN circuit) through an external controller portion 200.

Furthermore, the tandem color image forming apparatus 100 of the aforementioned embodiment employs the plurality of colors that are four colors including Cyan (C), Magenta (M), Yellow (Y), and Black (K). The colors employed by the apparatus of the invention are not limited to these four colors. The invention can be applied to an image forming apparatus employing five colors, which are obtained by adding a specific color to the four colors, and which thus has a train of five image forming units, and to another image forming apparatus, which has two series-connected IOTs and thus has a train of eight image forming units. The invention may be also applied to another tandem image forming apparatus that has a train of two drums each corresponding to two colors. Practically, this apparatus is adapted so that one of the drums is supplied with toner corresponding to two colors Y and M, while the other drum is supplied with toner corresponding to other two colors C and K.

Figure 2:
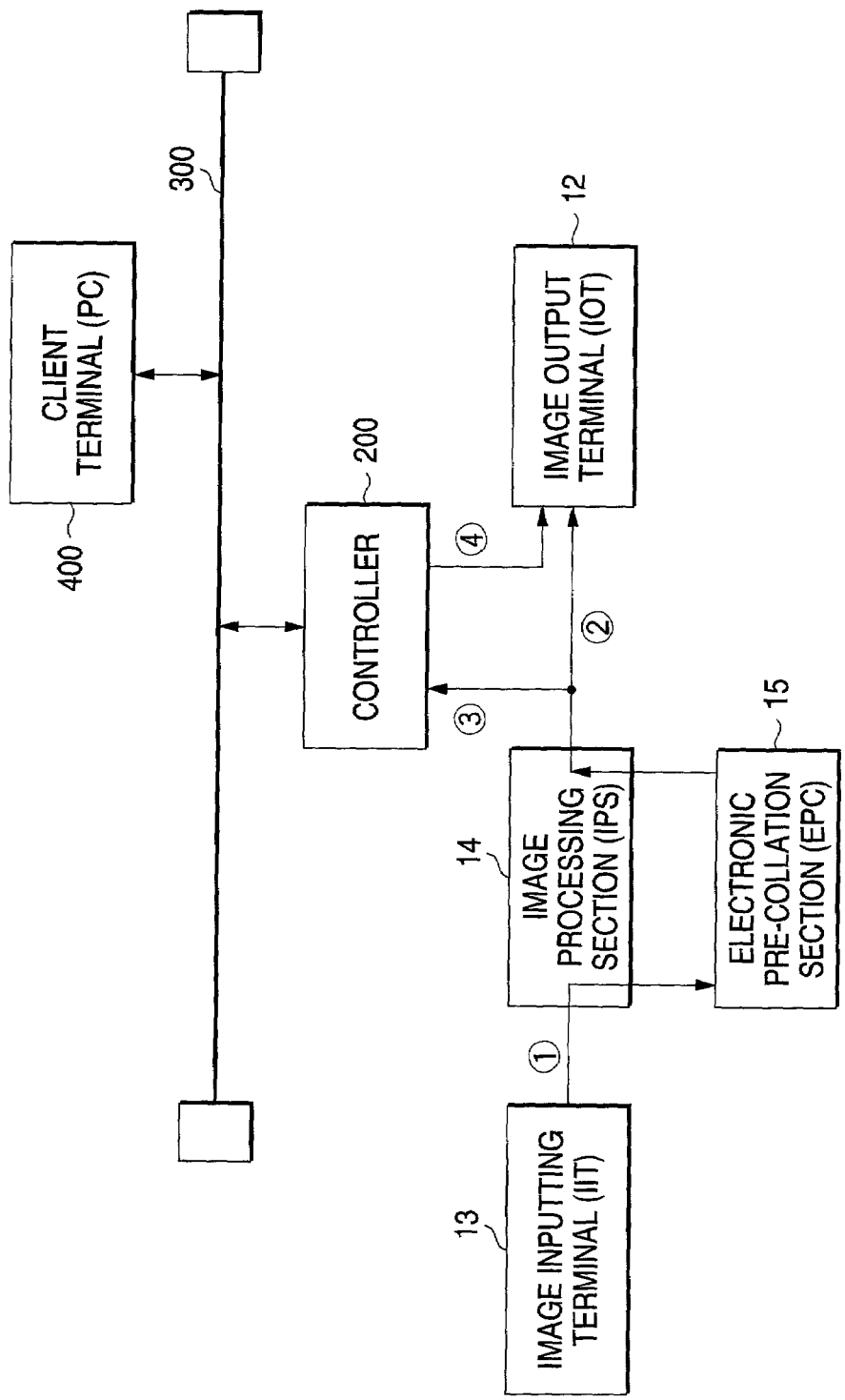
FIG. 2 is a block diagram showing outline of system configuration of the tandem color image forming apparatus shown in FIG. 1.

FIG. 2 is a schematic block diagram illustrating the tandem color image forming apparatus shown in FIG. 1.

As illustrated in FIG. 2, rough system configuration of this tandem color image forming apparatus 100 includes the image output terminal (IOT) 12, the image input terminal (IIT) 13, the image processing system (IPS) 14, and the electronic pre-collation portion (EPC) 15.

Further, this tandem color image forming apparatus 100 is connected through an external controller 200 to the client terminal 400, which is connected to a network 300.

(1) shown in FIG. 2 designates a copy scan operation, that is, reading image data of an original by the image input terminal (IIT), and storing the read image data in a storage device, such as HDD, through the image processing system (IPS) under control of the electronic pre-collation portion (EPC) 15. The image input terminal (IIT) may comprise a buffer memory for storing the image data temporarily.

Further, (2) designates an EPC to Print operation (a copy print job), that is, an operation to be performed when the image data, which is obtained by the scan operation (1) and stored in the storage device, such as a hard disk (HDD), is read therefrom to a page buffer and printed.

Moreover, "(1)→(2)" denotes a copy operation, that is, performing a sequence of the operations (1) and (2).

Furthermore, "(1)→(3)" designates a Scan to File operation, that is, an operation of transferring a file of image data, which is read by the image input terminal (IIT), to a printer controller section through the image processing system (IPS) so as to transfer the image data to the client terminal (PC) connected to the network.

Further, (4) designates a print operation (a print job), that is, an operation of causing the image output terminal (IOT) through a printer controller to print the image data according to a print instruction issued by the client terminal (PC) connected to the network.

Incidentally, the operations (2) and (3) are not operated simultaneously. Moreover, the operations (2) and (4) are not operated simultaneously. Further, there are the following four kinds of concurrent processing, that is, an operations (2)+(1) (next job), an operation (3)+(1), an operation (3)+(1)+(4), and an operation (1)+(4).

That is, the concurrent processing (2)+(1) is to perform the copy scan operation concurrently with and during the copy print job is performed.

Further, the concurrent processing (3)+(1) is to perform the copy scan operation concurrently with and during the transfer of an image data file to the client terminal connected to the network.

Moreover, the concurrent processing (3)+(1)+(4) is to perform printing according to the print instruction issued from the client terminal, which is connected to the network, concurrently with and in addition to the above-described operation (3)+(1).

Furthermore, the concurrent processing (1)+(4) is to perform printing (the print job) according to the print instruction issued from the client terminal, which is connected to the network, concurrently with and during the copy scan operation.

Figure 3:
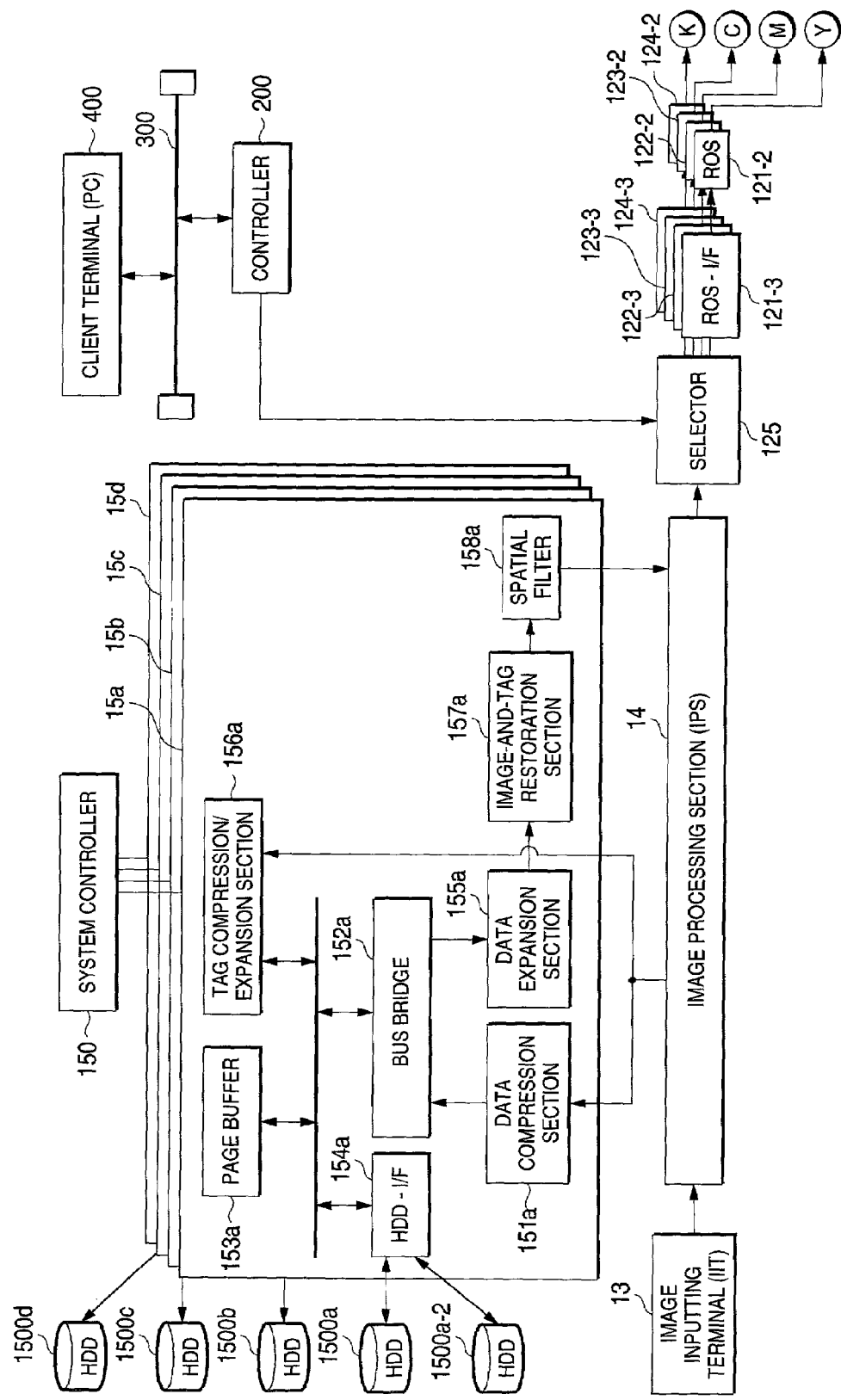
FIG. 3 is a diagram showing a more detailed system configuration of the tandem color image forming apparatus shown in FIG. 2.

FIG. 3 is a diagram illustrating more detailed system configuration of the tandem color image forming apparatus 100 shown in FIG. 2. FIG. 3 illustrates, especially, the electronic pre-collation portion (EPC) in detail.

As shown in FIG. 3, each of the electronic pre-collation portions (EPC) 15a to 15d comprises a corresponding one of data compression sections 151a to 151d, a corresponding one of bus bridges 152a to 152d, a corresponding one of page buffers 153a to 153d, a corresponding one of HDD interface portions 154a to 154d, a corresponding one of data expansion sections 155a to 155d, a corresponding one of TAG compression/expansion sections 156a to 156d, a corresponding one of image-and-tag restoration sections 157a to 157d, and a corresponding one of spatial filter portions 158a to 158d.

Further, each of the electronic pre-collation portions 15a to 15d is connected to a corresponding one of the hard disks (HDDs) 1500a to 1500d, which store image data corresponding to the colors, respectively, through a corresponding one of the HDD interfaces 154a to 154d. Moreover, as will be described later, in this embodiment of the invention, the EPC section corresponding to Yellow (Y) is connected to at least one hard disk (HDD) 1500a-2, which is exclusively used for storing an image data file to be used for the Scan-to-File operation (that is, for transmitting to the client terminal 400), in addition to the hard disk (HDD) 1500a for storing image data corresponding to Yellow (Y).

Incidentally, operations of the electronic pre-collation portions (EPCs) 15a to 15d are performed under the control of the system controller 150.

Incidentally, EPC may be constructed of one board by two colors or constructed of one board by four colors. That is, although page buffer is physically plural, one page buffer may be divided by software.

Further, the following description describes a sequence of operations to be performed by this apparatus.

First, a flow of image data processing to be performed at the time of reading image data is described hereinbelow.

Analog RGB image data read by the image input terminal (IIT) 13 is inputted to the image processing system (IPS) 14. Then, predetermined processing at each image input is performed thereon, so that the input image data is converted to four color image data respectively corresponding to the four colors, that is, Y (Yellow), M (Magenta), C (Cyan) and K (Black).

Each of image data corresponding to Y, M, C, and K is sent to a corresponding one of the EPC sections 15a to 15d, which correspond to these colors. Thereafter, in each of the EPC sections 15a to 15d corresponding to Y, M, C, and K, respectively, each of transferred and inputted image data is undergone predetermined compression processing (the corresponding compressibility is 1/5.33) performed by each of data compression sections 151a to 151d. Subsequently, each of image data corresponding to each of the colors is temporarily stored in a corresponding one of the page buffers 153a to 153d through a corresponding one of the bus bridges 152a to 152d. Thereafter, the image data corresponding to each of the colors is stored in a corresponding one of the HDD 1500a to 1500d through a corresponding one of the HDD interfaces 154a to 154d.

Next, a flow of image data processing to be performed at the time of forming an image is described hereinbelow.

When the image is printed, the image data corresponding to each of the colors, which is stored in a corresponding one of the HDDs 1500a to 1500d by the processing performed at the time of reading the image, is read out through a corresponding one of the HDD interfaces 154a to 154d to a corresponding one of the page buffers 153a to 153d. Thereafter, the read out image data corresponding to each of the colors is transferred to a corresponding one of the data expansion sections 155a to 155d through a corresponding one of the bus bridges 152a to 152d. In the data expansion sections 155a to 155d, expansion processing is performed on the image data corresponding to the colors, respectively. Then, a set of the expanded image data, which corresponds to each of colors, and corresponding tag information is restored in a corresponding one of the image-and-tag restoration sections 157a to 157d. Then, predetermined spatial processing is performed on the restored image data, which corresponds to each of colors, in a corresponding one of the spatial filter portions 158a to 158d. Subsequently, the image data corresponding to each of colors is transferred to the image processing system (IPS) 14. Further, predetermined processing to be performed at image output is performed on the image data in the image processing system (IPS) 14. Then, resultant image data is outputted to the image output terminal (IOT) 12. In the image output terminal (IOT) 12, first, the image data corresponding to each of colors is selected. Subsequently, the selected image data is outputted to a corresponding one of the image forming unit portions 121 to 124, which correspond to the colors, respectively.

That is, the selected image data corresponding to each of colors is outputted to a corresponding one of the ROS-I/F portions 121-3 to 124-3 and a corresponding one of the ROS portions 121-2 to 124-2.

Thus, each of ROS 121-2 to 124-2 causes image forming laser light to scan each of surfaces of the photosensitive drums 121-1 to 124-1 according to the inputted image data. Then, the scanned surfaces thereof are exposed so that electrostatic latent images are formed thereon.

Incidentally, the number of the storage medium, such as hard disks (HDDs), is determined so that transfer bandwidth (or transfer frequency) corresponding to image data to be printed out is less than transfer bandwidth (or transfer frequency) of the storage medium.

Hereinafter, an outline of the concurrent processing is described with reference to FIGS. 4 and 5.

Figure 4:
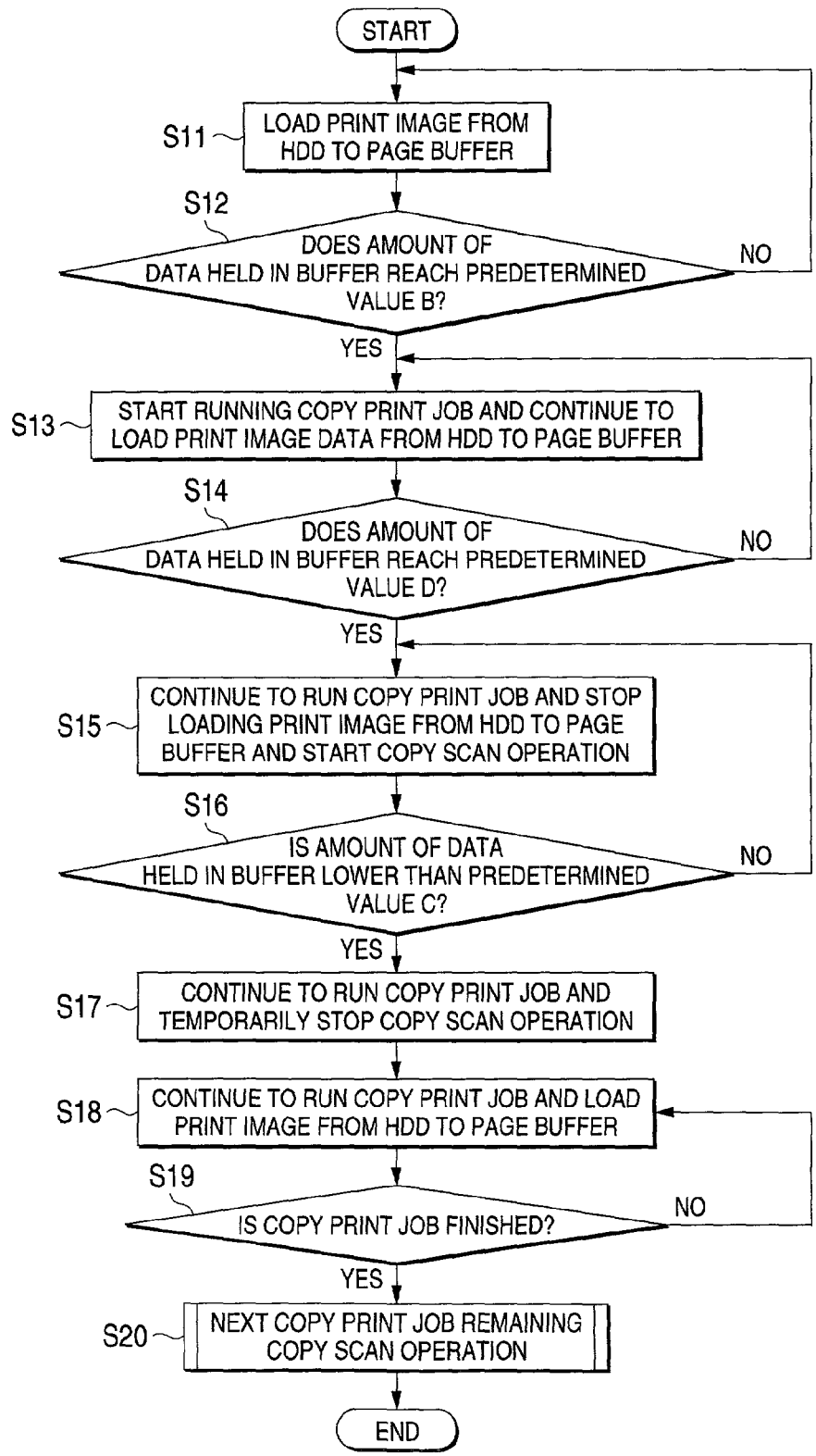
FIG. 4 is a flowchart showing schematic processing operation procedures of concurrent processing.
Figure 5:
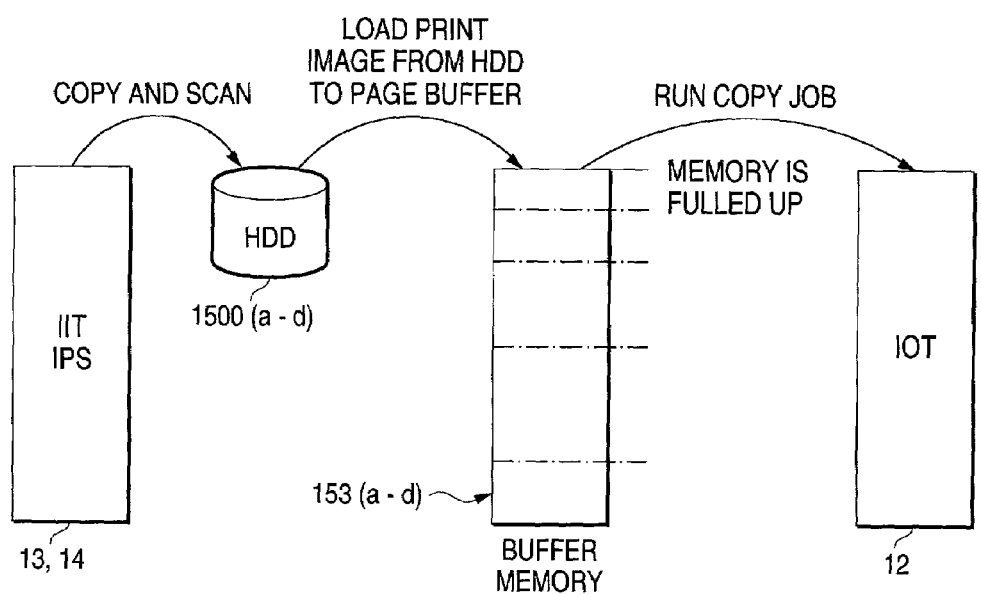
FIG. 5 is a reference drawing of the flowchart shown in FIG. 4.

FIG. 4 is a flowchart illustrating an outline of a procedure for performing the concurrent processing. This flowchart illustrates the concurrent processing (2)+(1), that is, the concurrent processing to be performed in a case of performing the copy scan operation concurrently during performing the copy print job. Further, FIG. 5 is a reference diagram of the flowchart and illustrates a threshold value employed in a buffer memory and a flow of video signals.

As illustrated in FIG. 4, first, print image data is loaded from each of HDDs 1500a to 1500d to each of page buffers 153a to 153d (step S11).

Thereafter, it is decided whether or not an amount of data held in each of the page buffers 153a to 153d reaches a predetermined value B (step S12).

When a result of the decision in step S12 reveals that the amount of data held in each of the page buffers 153a to 153d reaches the predetermined value B (namely, when control exits from step S12 through YES-branch), a copy print job is subsequently started. Moreover, control continues to load the print image data into the page buffers from the HDDs 1500a to 1500d (step S13).

Thereafter, it is decided whether or not the amount of data held in each of the page buffers 153a to 153d reaches a predetermined value D (step S14).

When a result of this decision made in step S14 shows that the amount of data held in each of the page buffers 153a to 153d reaches the predetermined value D (namely, when control exits from step S14 through YES-branch), the copy print job is subsequently continued, while control stops loading the print image data into the page buffers from the HDDs 1500a to 1500d. Then, a copy scan operation is commenced (step S15).

Thereafter, it is determined whether or not the amount of data held in each of the page buffers 153a to 153d is lower than a predetermined value C (step S16).

When a result of this decision made in step S16 shows that the amount of data held in each of the page buffers 153a to 153d is lower than the predetermined value C (namely, when control exits from step S16 through YES-branch), subsequently, the copy print job is continued, while the copy scan operation is temporarily stopped (step S17). Then, in step S18, print image data is loaded from the HDDs 1500a to 1500d into the page buffers 153a to 153d, while the copy print job is continued.

Thereafter, it is decided in step S19 whether or not the copy print job is finished. When a result of this decision made in step S19 indicates that the copy print job is finished (namely, when control exits from step S19 through YES-branch), control proceeds to the next copy print job and the remaining copy scan operation processing in step S20 (if there is the next copy print job, the control proceeds to step S11). Then, this processing is finished.

Incidentally, when a result of the decision made in step S12 shows that the amount of data held in each of the page buffers 153a to 153d does not reach the predetermined value B (namely, when control exits from step S12 through NO-branch), control returns to step S11, and then those similar to the aforementioned operations are performed.

Further, when a result of the decision made in step S14 shows that the amount of data held in each of the page buffers 153a to 153d does not reach the predetermined value D (namely, when control exits from step S14 through NO-branch), control returns to step S13, and then steps similar to the aforementioned operations are performed.

Moreover, when a result of the decision made in step S16 shows that the amount of data held in each of the page buffers 153a to 153d is not smaller than the predetermined value C (namely, when control exits from step S16 through NO-branch), control returns to step S15, and then those similar to the aforementioned operations are performed.

Furthermore, when a result of the decision made in step S19 shows that the copy print job is not finished (namely, when control exits from step S19 through NO-branch), control returns to step S18, and then those similar to the aforementioned operations are performed.

Although the threshold values B, C, and D are used as criteria for determining an order of processing jobs in this embodiment, it is not always necessary to set threshold values for the buffer memories. Such decisions may be made according to the number of printed pages.

Incidentally, the invention is effective, especially, in an image forming apparatus adapted to perform the concurrent processing as described above.

The outline of a first embodiment will now be described.

According to the first embodiment, in the event that it takes a long time to read image data from the storage device, such as a hard disk drive (HDD), to the page buffer due to read error, in order to certainly assure that storage of image data of the four colors (YMCK) is present in the page buffers 153a through 153d at the timing at which paper is to be fed without increasing the capacity of the page buffer in vain, at first, feeding paper does not start till image data of all colors of a page to be printed are stored in the page buffers 153a through 153d. Secondary, the page buffers 153a through 153d have memory capacity capable of storing image data corresponding to the amount of a gap among drums.

Hereinafter, the first embodiment will be described in detail by giving a specific example.

Figure 6:
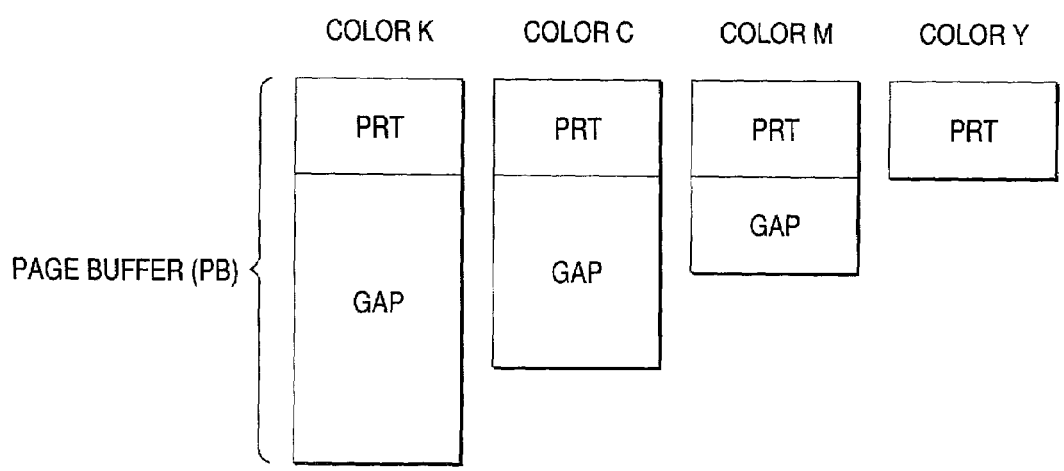
FIG. 6 is a diagram showing an configuration example of a page buffer of electronic pre-collation (EPC) of each YMCK color shown in FIG. 3.

FIG. 6 shows an example of configuration of the page buffers 153a through 153d of the EPCs 15a through 15d of YMCK shown in FIG. 3. The configuration of the page buffers 153a through 153d is a characteristic of the present invention.

As shown in FIG. 6, in the configuration of the page buffers 153a through 153d, in order to ensure that image data of four colors (YMCK) are present in the page buffers 153a through 153d at a timing at which paper is to be fed, each of the page buffers 153a through 153d of YMCK has a memory area corresponding to the amount of gap (GAP) among drums (hereinafter often called a "GAP memory area").

Here, the expression the amount of gap among drums (GAP) means image data corresponding to a difference in timings at which color toner images formed on the photosensitive drums 121-1 through 124-1 are transferred to a transfer member. The image data corresponding to the difference between the timings are stored in the GAP memory area.

In the present embodiment, images are developed and transferred in sequence of YMCK. Hence, in terms of GAP, a relationship K>C>M>Y stands in memory capacity.

In addition to the amount of gap among drums GAP memory area, each of the page buffers 153*a* through 153*d* has a print page memory area for storing image data of a print page (PRT). Here, a capacity of memory for print page has at least an amout of one page of print data.

A sum of the capacity of the GAP memory area and the print page PRT memory capacity may be set to a capacity capable of storing non-compression image data of two images of A3 paper size, which is the maximum size to be processed. Even in case of non-compression image data, a front image and a back image can be output alternately by the Tray-less double-side transfer method.

The reason for storing image data which is the amount of two pages of maximum paper size is that even if a hard disk drive becomes inoperative for any reason, double side print can be output so long as compression data of two pages (front and back pages) are stored in the page buffer. If non-compression image data are printed for ensuring high quality, there will arise a necessity for printing image data directly from a page buffer without storing the data temporarily in a hard disk, because non-compression image data are of a large amount to lag in data transfer. Hence, it is necessary for a page buffer to store non-compression image data of at least two pages (the front and back pages).

For the sake of clarity, the concept of GAP will be described with reference to examples shown in FIGS. 7 through 10.

Figure 7:
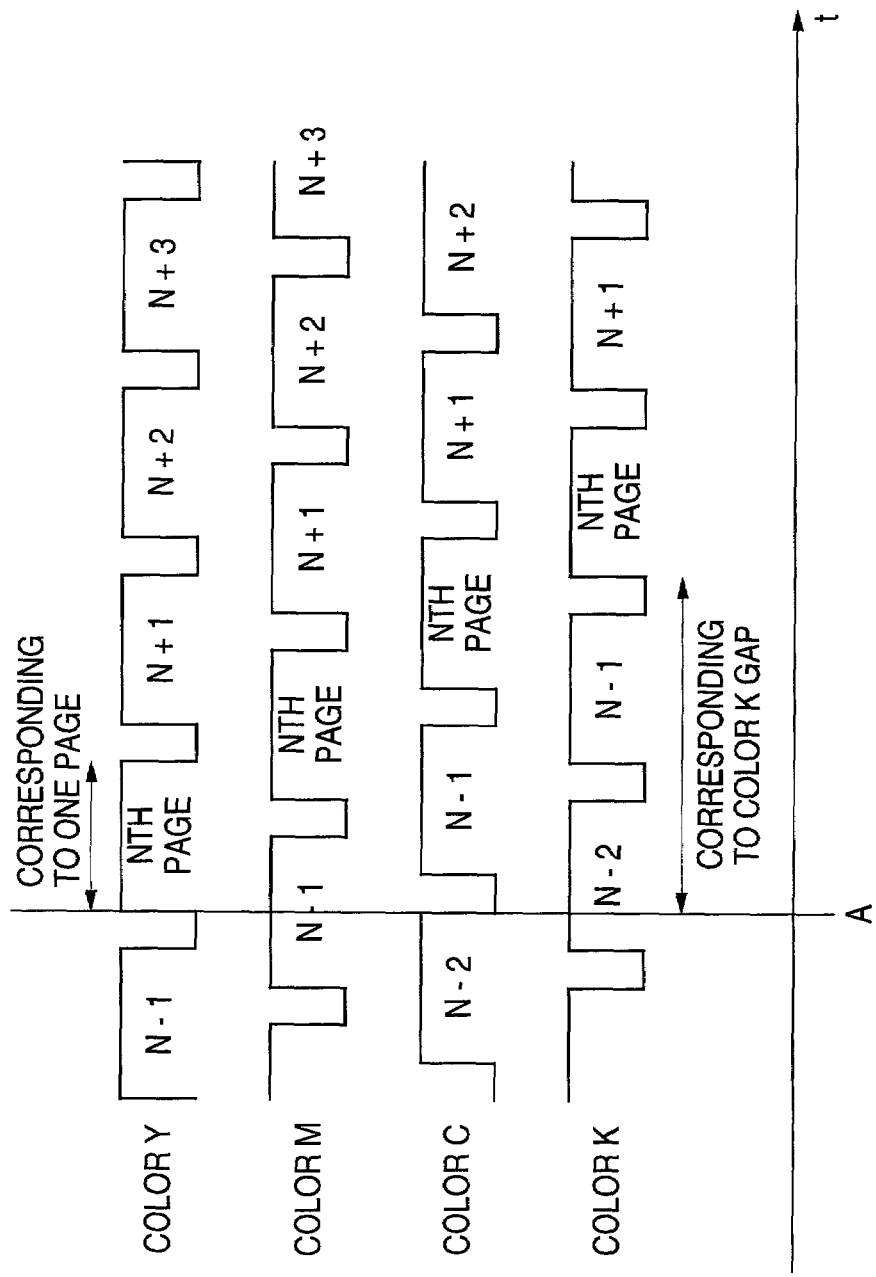
FIG. 7 is a timing chart showing that in a case of pa single-sided printing, a toner color image of each color formed on a photosensitive drum of each YMCK color is sequentially transferred to a transfer member with time.

FIG. 7 is a timing chart, showing a case where color toner page images formed on the photosensitive drums 121-1 through 121-4 of YMCK, respectively, are sequentially transferred onto a transfer member with time.

As shown in FIG. 7, attention is paid to a certain timing A. At the timing A, a Y drum starts transfer of an Nth paper. At this time, an M drum is in a course of transferring an N−1th paper, and a C drum is finished transferring an N−2th paper. Further, a K drum is in a course of transferring the N−2th paper.

Thus, there is a difference exists among the photosensitive drums in the print pages to be transferred.

Figure 8:
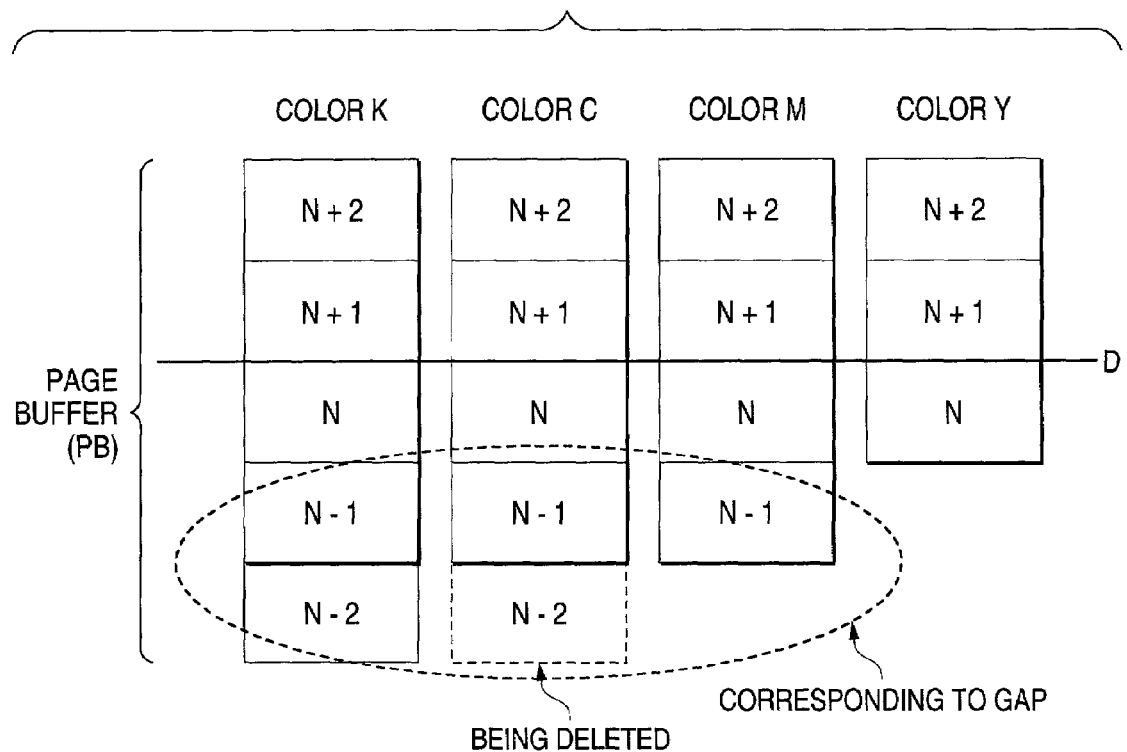
FIG. 8 is a diagram showing a state of storing the image data in the page buffer of each color at a timing A shown in FIG. 7.

FIG. 8 shows a state in which image data are stored in the page buffers 153*a* through 153*d* at the timing A.

As shown in FIG. 8, in this example, in the color-Y page buffer 153*a*, there are stored image data of an Nth paper which is about to be subjected to printing, image data of an N+1th paper which has already been fed but has not yet arrived at a color-Y transfer point, and image data of an N+2th paper.

In the color-M page buffer 153*b*, there are stored image data of to an N−1th paper, which is currently being printed; image data of the Nth paper, which is about to be printed in the color Y; and image data of the N+1th and N+2th papers, which have already been fed.

In the color C page buffer 153*c*, there are stored image data of the N−1th paper, which is currently being printed in the color M; image data of the Nth paper, which is about to be printed in the color Y; and image data of the N+1th and N+2th papers, which have already been fed. Image data enclosed by dotted lines designate image data of the N−2th paper, which has now finished being printed, and the data are being deleted.

In the color-K page buffer 153*d*, there are stored image data of the N−2th paper, which has finished being printed in the color C and is now being printed; image data of the N−1th paper, which is now been printed in color M; and image data of the Nth paper, which is about to be printed in the color Y.

As mentioned above, there is a difference among the drums in the print page to be transferred. Hence, each of the color page buffers stores image data corresponding to an amount of difference in transfer among the drums.

Next, double-sided printing will be described. In this example, five sheets of paper can be retained in the image forming apparatus. After front surfaces of the five sheets of paper have been printed, the sheets of paper return to a transfer point by way of a transport to be inverted, and back surfaces of the sheets of paper are printed.

Figure 9:
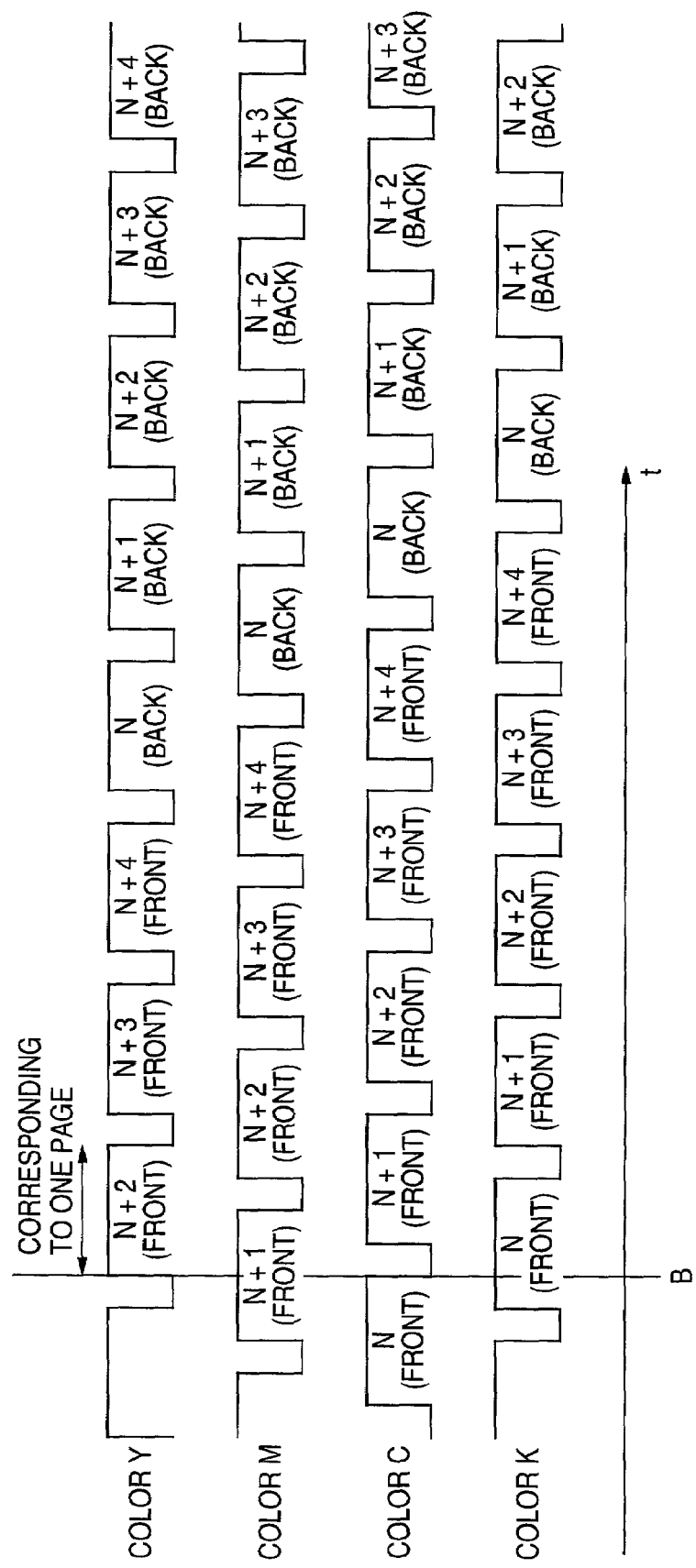
FIG. 9 is a timing chart showing that in a case of a single-sided printing, a toner color image of each color formed on a photosensitive drum of each YMCK color is sequentially transferred to a transfer member with time.

FIG. 9 is a timing chart of double-sided printing operation showing that color toner images formed on the Y, M, C, and K photosensitive drums 121-1 through 124-1 are sequentially transferred onto a transfer member with time.

As shown in FIG. 9, attention is paid to certain timing B. The timing B shows that the color Y drum is about to start transfer of an image onto a front surface of an N+2th paper. The color M drum is now in course of transferring an image onto a front surface of an N+1th paper. The color C drum has now finished transferring an image onto a front surface of an Nth paper. The color K drum is now in course of transferring an image onto the front surface of the Nth paper.

There is a difference among the drums in print pages to be transferred.

Figure 10:
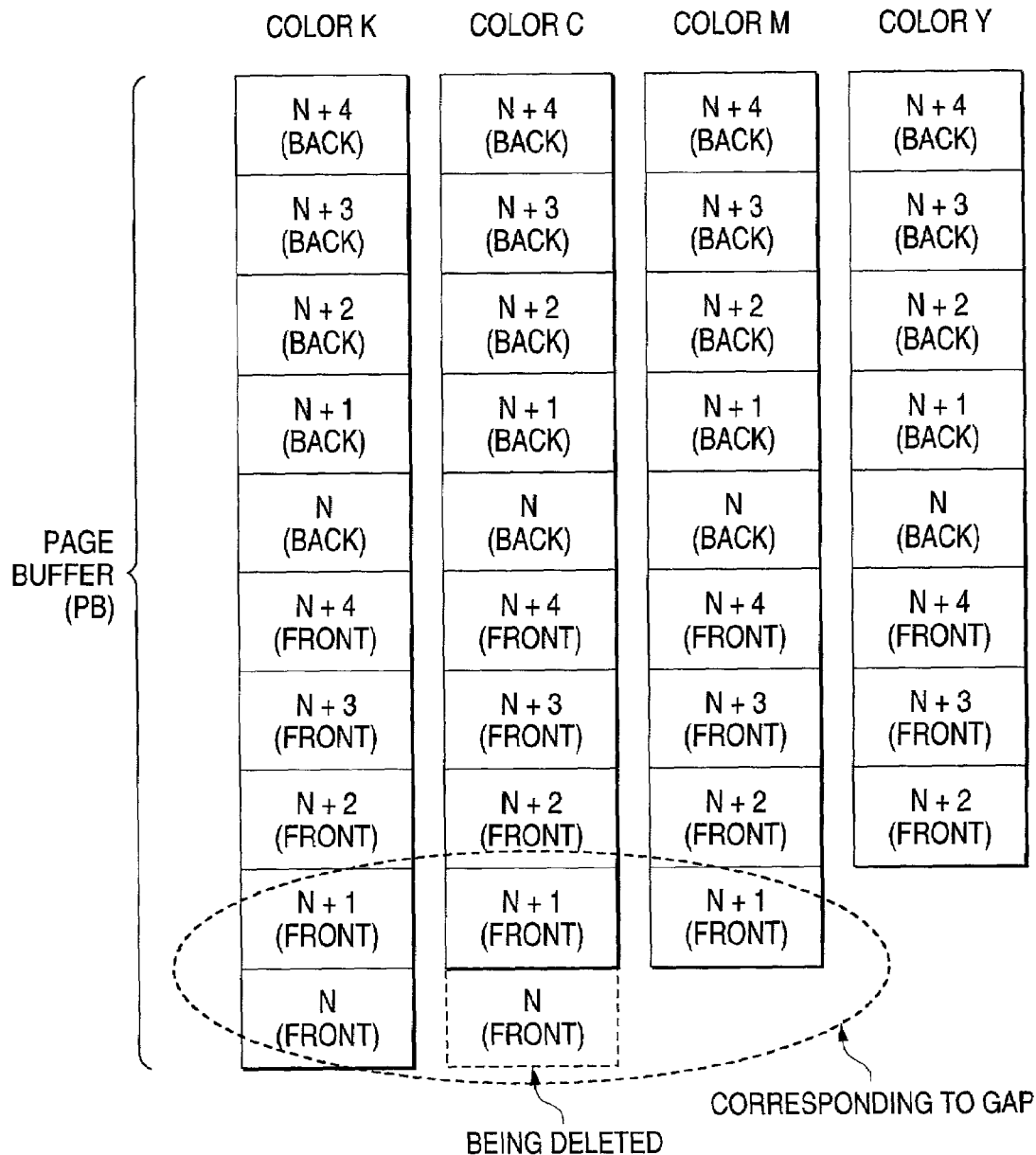
FIG. 10 is a diagram showing a state of storing the image data in the page buffer of each color at a timing B shown in FIG. 9.

FIG. 10 shows a state in which image data are stored in the color page buffers 153*a* through 153*d* at the timing B.

AS shown in FIG. 10, in this example, in the color Y page buffer 153*a*, there are stored image data of the front surface of the N+2th paper, which is about to be printed; image data of a front surface of an N+3th paper, which has not yet arrived at a color-Y transfer point and has already been fed; image data of a front surface of an N+4th paper, and image data of back surfaces of the Nth, N+1th, N+2th, N+3th, and N+4th papers fed for the double-sided printing.

In the color M page buffer 153*b*, there are stored image data of the front surface of the N+1th paper, which is currently in course of being printed; image data of the front surface of the N+2th paper, which is about to be printed in the color Y; image data of the front surfaces of the N+3th and N+4th papers, which have already been fed; and image data of the back surfaces of the Nth, N+1th, N+2th, N+3th, and N+4th papers fed for the double-sided printing.

In the color C page buffer 153*c*, there are stored image data of the front surface of the N+1th paper, which is currently in course of being printed in the color M; image data of the front surface of the N+2th paper, which is about to be printed in the color Y; image data of the front surface of the N+3th and N+4th papers, which have already been fed; and image data of the back surfaces of the Nth, N+1th, N+2th, N+3th, and N+4th paper fed for the double-sided printing. Image data enclosed by dotted lines designate image data of the front surface of the Nth paper, which has now finished being printed, and the data are being deleted.

In the color K page buffer 153*d*, there are stored image data of the front surface of the Nth paper, which has been printed in the color C and is currently in course of being printed; image data of the front surface of the N+1th paper, which is being printed in the color M; and image data of the front surface of the N+2th paper, which is about to be printed in the color Y.

As mentioned above, since there is a difference in print pages to be transferred, each of the color page buffers stores image data corresponding to an amount of difference in transfer among the drums and image data for ensuring printing of back surfaces of papers fed for the double-sided printing.

According to such a configuration, even if it takes a long time to read image data from the storage device such as HDD and the like to the page buffer due to the read error or the like, it can be ensured with minimum capacity of the page buffer that image data of four colors (YMCK) are stored in the page buffer at a timing to feed a paper. As a result, it can be prevented that preparation of print data lags to generate copy failures such as discharge of erroneously-printed paper or discharge of unwanted white paper.

FIG. 11 is a diagram showing an example configuration of the page buffers 153a through 153d of the EPCs 15a through 15d of each color shown in FIG. 3 and is a modification of the page buffers 153a through 153d shown in FIG. 6.

As shown in FIG. 11, in addition to construction of the page buffer shown in FIG. 6, that is, the GAP memory area and the print page (PRT) memory area, this construction of the page buffers 153a through 153d further comprise a Scan Ahead (SA) memory area.

Here, the term "Scan Ahead" means to ahead read an original of a next job during printing of a current job. The original data of the next job to be read ahead during printing of the current job are stored in the Scan Ahead (SA) memory area.

The print page (PRT) memory capacity is at least one page of print data. Further, the Scan Ahead (SA) memory capacity has at least one page of image data for SA.

According to such configuration, even if it takes a long time to read image data from the storage device such as HDD and the like to the page buffer due to the read error or the like, it can be ensured with minimum capacity of the page buffer that image data of four colors (YMCK) are stored in the page buffer at a timing to feed a paper. As a result, it can be prevented that preparation of print data lags to generate copy failures such as discharge of erroneously-printed paper or discharge of unwanted white paper. Furthermore, a function of Scan Ahead can be also realized.

FIG. 12 is a diagram showing an example configuration of the page buffers 153a through 153d of the EPCs 15a through 15d of each color shown in FIG. 3. FIG. 12 is a modification of the page buffers 153a through 153d shown in FIGS. 6 and 11.

As shown in FIG. 12, in addition to the construction of the page buffer shown in FIG. 11, that is, the GAP memory area, the print page (PRT) memory area, and the Scan Ahead (SA) memory area, the page buffer 153a of first development color has a Scan-to-File memory area.

Here, the expression "Scan-to-File" means an image data file to be used for transferring image data obtained through scanning to the client terminal (PC) 400 connected to the network 300 to edit an image. Data format of the Scan-to-file is RGB, L*a*b*, YMCK, and the like. Data transferred to the client terminal (400) (or data read from the IIT) are handled as non-compression or reversible compression data so that the data are protected from deterioration.

According to such a configuration, all the Scan to File data are transferred to the client terminal (PC) 400 connected to the network 300 by way of a path Y.

In the present embodiment, the page buffers of YMCK have the same memory capacity. At this time, the largest memory capacity of all the memory capacities required for each of YMCK colors is taken as a common memory capacity. More specifically, memory for the first development color (i.e., a color Y in the embodiment) requires a memory capacity sufficient for the Scan to File function. Memory for fourth development color (i.e., the color K in the embodiment) requires a large memory capacity because of it's the largest GAP. Hence, larger one of the memory capacity for the first development color and the memory capacity for the fourth development color is taken as a reference to determine memory capacities for all colors.

According to this configuration, the Scan to File function is assigned to a page buffer of color which is to be processed first by a tandem print engine. Hence, the capacity of a page buffer cannot be changed for each color. Accordingly, a substrate constituting the EPCs 15a through 15d can be used commonly among colors and as compared with the case of a printer employing substrates specifically designed for four colors, management cost can be significantly curtailed.

There will now be described a second embodiment.

With reference to flowcharts shown in FIGS. 13 and 14, there will be described a processing operation according to the present invention in case that output from the IOT is controlled in accordance with state of storage of image data in the page buffers.

Figure 13:
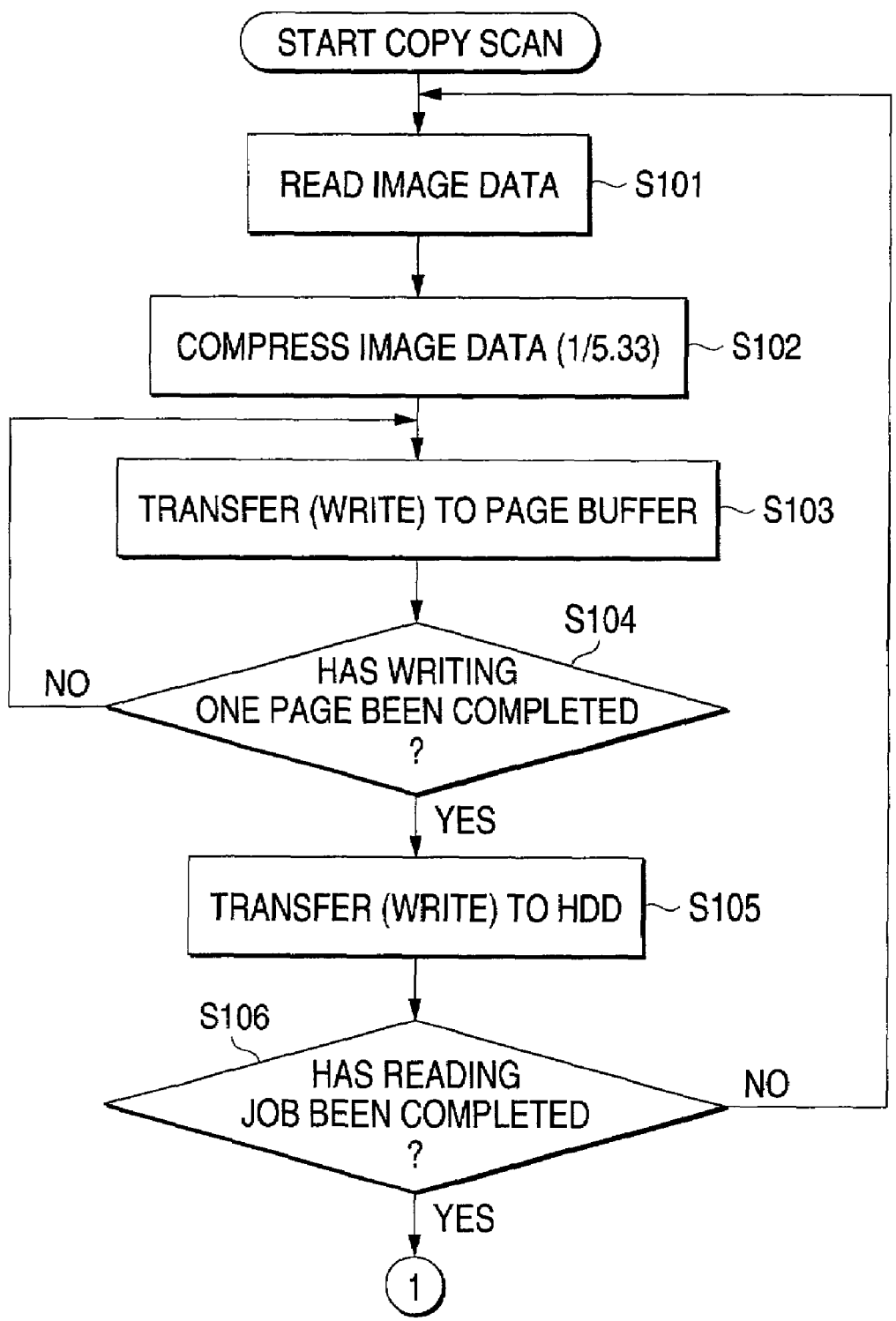
FIG. 13 is a flowchart showing processing operation procedures at reading (copy-scanning) image data.

FIG. 13 is a flowchart showing processing procedures to be performed at a time of reading of image data (i.e., a copy scan operation).

As shown in FIG. 13, reading image data is performed at the IIT 13 (step S101).

Subsequently, compression of the read image data is performed at the EPC 15 (step S102). Here, a specific compression ratio is 1/5.33.

Next, the thus-compressed image data are transferred to (written into) the page buffers 153a through 153d (step S103). A determination is made as to whether or not image data of one page have been written (step S104). When the result of the determination shows that the image data of one page have finished being written (step S104 YES), the image data are transferred to (written into) an HDD (step S105).

Subsequently, a determination is made as to whether or not reading of image data of this job has been completed (step S106). When the result of the determination shows that reading of image data of the job has been completed (step S106 YES), the process proceeds to processing ①, that is, an output process operation procedure of image data.

When the result of the determination made in step S106 shows that the reading of image data of the job has not yet been completed (step S106 NO), process returns to the step S101, to perform the same processes as the above described.

Figure 14:
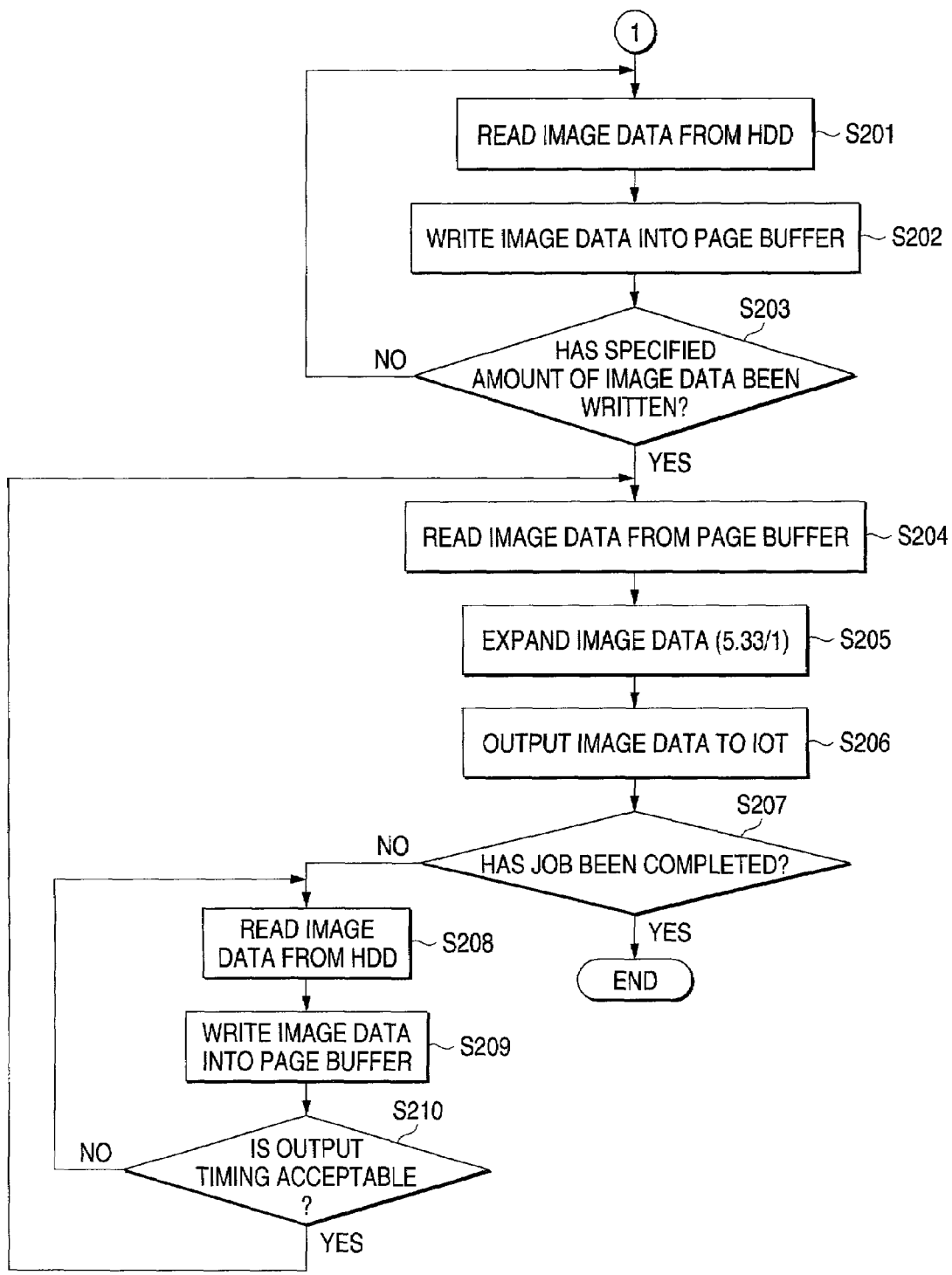
FIG. 14 is a flowchart showing processing operation procedures at outputting image data.

FIG. 14 is a flowchart showing the process operation procedure when outputting image data.

As shown in FIG. 14, print image data is read from an HDD (step S201), and the image data is written into a page buffer (step S202).

A determination is made as to whether or not an amount of the image data written into the page buffer has reached a specified amount (step S203).

When the result of determination shows that the amount of the written image data has reached the specified amount (step S203 YES), the print image data is read from the page buffer (step S204). The image data is expanded (5.33/1) (step S205), and the expanded image data is outputted to the IOT (step S206).

A determination is made as to whether or not output of the job has been completed (step S207). When the result of the determination shows that the job has been completed (step S207 YES), process is terminated.

When the result of the determination made in step S203 shows that the amount of the written image data has not yet reached the specified amount (step S203 NO), process returns to step S201 to perform the same process as described above.

When the result of the determination made in step S207 shows that the job has not yet been completed (step S207 NO), the print image data is read from the HDD (step S208). The image data are then written into the page buffer (S209).

Subsequently, an output timing is checked (step S210).

If the result of check shows that the output timing is acceptable (step S210 YES), the process proceeds to step S204 to perform the same process as the above described.

When the result of the determination in step S210 shows that the output timing is non-acceptable (step S210 NO), the process proceeds to step S208 to perform the same process as the above described.

Here, the specified amount described in step S203 shown in FIG. 14 means a storage amount of image data corresponding to a paper of one lap along a transfer drum, a transfer belt, or an intermediate transfer belt, or a storage amount of image data corresponding to the number of sheets of paper retained in an image forming apparatus in accordance with an individual output mode, such as a single-sided printing, a double-sided printing, whether or not the image forming apparatus has an optional paper feed tray, a post-process apparatus, or the like.

According to such configuration, even if unnecessary investment such as increasing the capacity of the page buffer is not conducted, it can be prevented from occurring that print output is interrupted in mid course.

A third embodiment will now be described.

Process operation procedure to be performed in case that feeding of paper is controlled in accordance with a storage state of image data in the page buffers will now be described with reference to a flowchart shown in FIG. 15.

Figure 15:
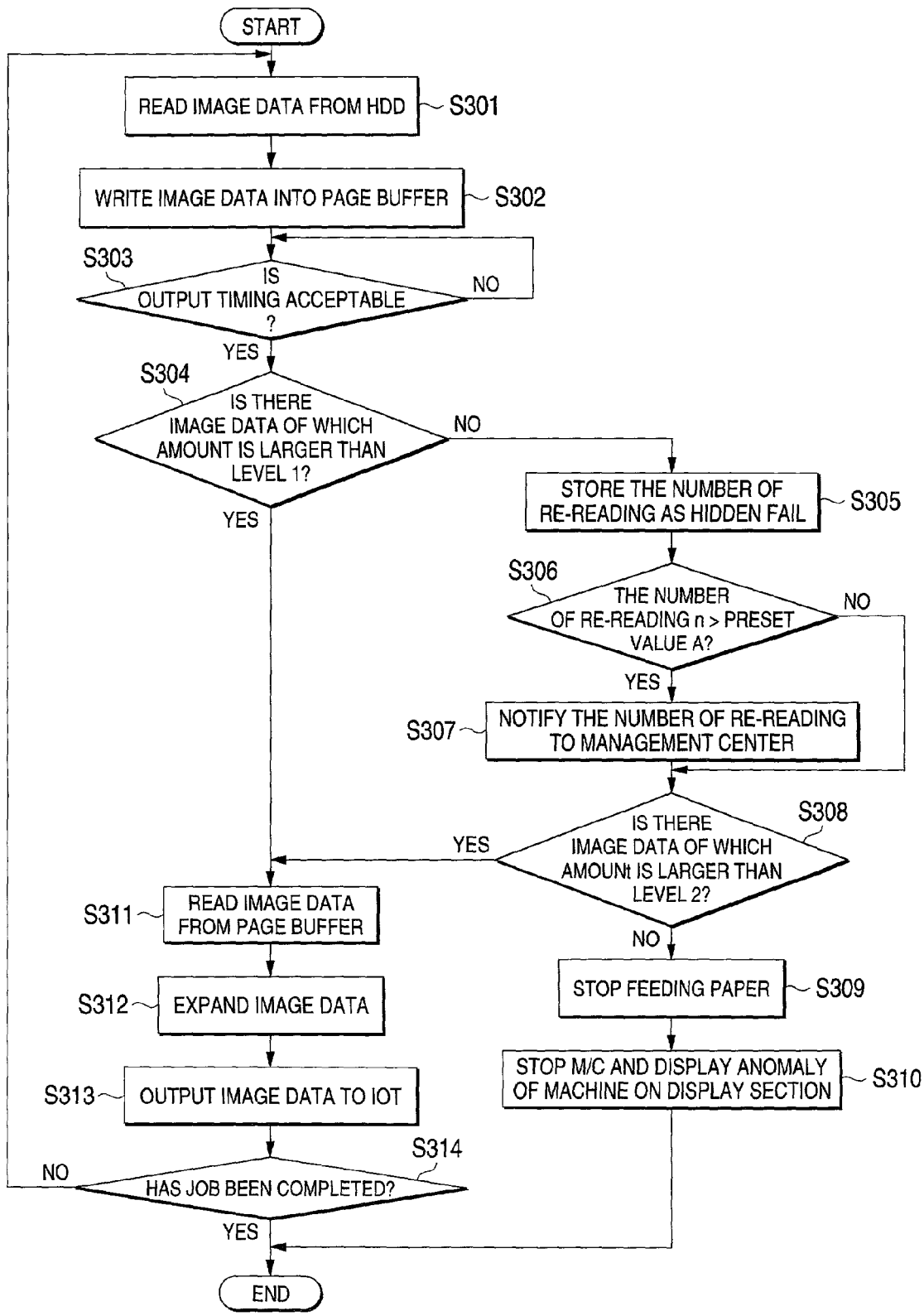
FIG. 15 is a flowchart showing processing procedures in case of controlling paper feed in accordance with a state of accumulation of image data into page buffers.

FIG. 15 is a flowchart showing process procedure to be performed in case that feeding of paper is controlled in accordance with the storage state of image data in the page buffers.

As shown in FIG. 15, when a copy print job is started, image data is first read from an HDD (step S301), and the image data is written into the page buffer (step S302).

A determination is made as to whether or not an output timing is acceptable (step S303).

If the result of the determination shows that preparation of the output timing is acceptable (step S303 YES), a determination is made as to whether or not image data of predetermined level 1 (e.g., about 70% of the page buffer) or more is stored in the page buffer (step S304).

When the result of the determination shows that image data of the predetermined level 1 or more is not present (step S304 NO), the number of generations of re-reading (n) is stored by a hidden fail and a client cannot see the number (step S305). A normal fail stops the machine to send out a warning. On the contrary, the hidden fail does not stop the machine. However, the hidden fail has at lease one mode of (1) displaying a message and (2) not displaying a message to a normal user, but notifying failure to a service man, a machine administrator, an administrator educated to be able to perform maintenance of some region of the machine, or the like.

After storage of the number of re-reading, a determination is made as to whether or not the number of re-reading (n) exceeds a preset value A (where A is an arbitrary integer), namely, as to whether or not the number of re-reading exceeds a threshold value A for notifying the number of re-reading (n) to a system control center in order to warn occurrence of anomaly.

When the result of the determination shows that the number of re-reading (n) exceeds the preset value A (step S306 YES), the number of re-reading (n) is notified to the system control center (step S307).

After notifying the number of re-reading, a determination is made as to whether or not image data of larger than a predetermined level 2 is retained in the page buffer (step S308) (e.g., about 30% of the page buffers: i.e., a threshold value for determining that since fatal anomaly occurs, if an operation is continued, an image can not be formed on a fed paper to stop an operation of an apparatus).

When the result of the determination shows that image data of predetermined level 2 or more does not exist (step S304 NO), feeding of paper is stopped (step S309). Subsequently, the operation of the apparatus is stopped and an anomaly in the apparatus is displayed on a display section (step S310). Process is then terminated.

When the result of the determination in step S306 shows that the number of re-reading (n) exceeds the present value A (step S306 NO), process proceeds to step S308 to perform the same process described above.

When the result of the determination in step S308 shows that image data of the predetermined level 2 or more are retained in the page buffer (step S308 YES), image data are read from the page buffer (step S311). The read image data is expanded (step S312), and the expanded image data is then outputted to the IOT (step S313).

Subsequently, a determination is made as to whether or not output of a print job has been completed (step S314). When the result of the determination shows that the print job has been completed (step S314 YES), process of the print job is completed.

When the print job is determined not to have been completed (step S314 NO), process returns to step S301 to perform the same process as the described above. Further, about 30% of the level 1 corresponds to the following values. That is, when the amount of image data stored in the page buffer is lower than this value, the image data is deficient in relation to the number of sheets of non-transferred paper remaining in the image forming apparatus (i.e., white paper located between a paper tray and a transfer point) even when feed of paper is stopped. More accurately, the amount of image data to be printed differs between single-sided printing and double-sided printing. Hence, a value of 30% differs between single-sided printing and double-sided printing. More specifically, the value corresponds to the amount of image data to be printed on the paper, which has already been fed.

Here, 70% of the level 2 is a value derived from experimentation. The value corresponds to a value for enabling a stable transfer operation in case of transfer for reading data from the HDD device and writing the data to the buffer memory and transfer for reading data from the buffer memory and transferring the image forming section.

Accordingly, monitoring is effected from when the amount of image data stored in the buffer memory has dropped below about 70%, and feeding of paper is stopped when the amount of image data has dropped below about 30%.

According to this configuration, in a digital image forming apparatus having an electronic sorting function of reading image data stored in a storage device, such as a hard disk drive to print the image data, the overall productivity of the image forming apparatus can be improved without increasing memory capacity as a page buffer more than necessity. In the event that an error has arisen in transfer of image data into memory during a printing operation, recovery of the image data can be performed automatically. Since omission of image data can be prevented, the amount of paper required by print failures can be curtailed, and output of undesired white paper can also be diminished.

Figure 16:
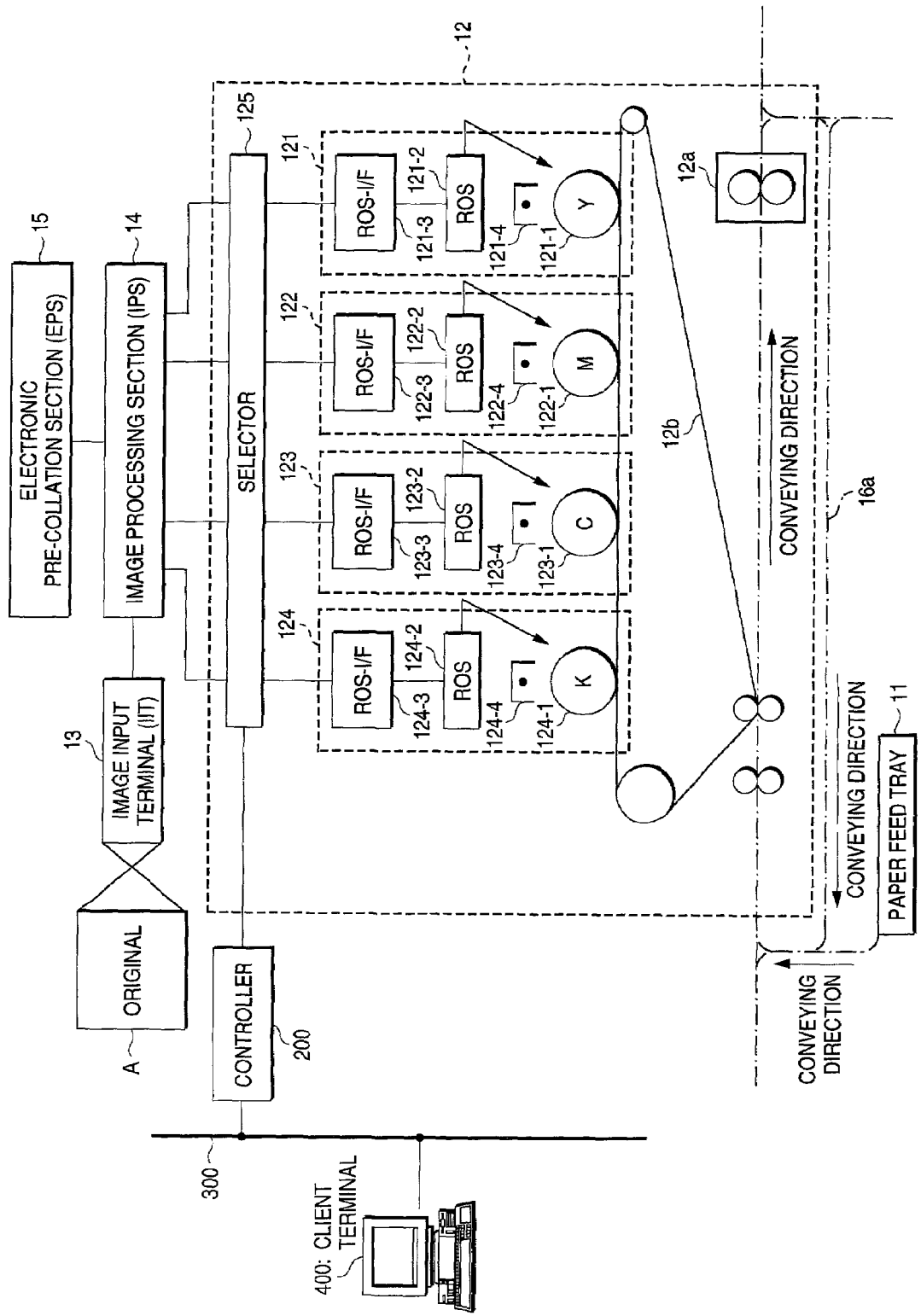
FIG. 16 shows a modification of the image formation system shown in FIG. 1.

The tandem color image forming apparatus according to the present invention is not limited to the configuration shown in FIG. 1. As shown in FIG. 16, the image forming apparatus may be constructed such that the IOT 12 has an intermediate transfer member 12b and that a toner image is transferred to a paper by way of the intermediate transfer member 12b.

The tandem color image forming apparatus shown in FIGS. 1 and 16 is constructed such that an image is formed through use of photosensitive drums, but the present invention is not limited to such a configuration. For instance, the present invention can also be applied to an image forming apparatus having image forming section, such as an ink-jet.

As described above, according to the first and second aspects of the invention, there is provided an image forming apparatus comprising: a first storage section adapted to store image data of a plurality of colors constructing a predetermined color space, respectively; a plurality of second storage sections corresponding to the plurality of colors, respectively, and having different capacities from each other; and a plurality of image forming sections corresponding to the plurality of colors, respectively and having different image forming positions from each other, wherein the image data of each of colors is read from the first storage section to each of second storage sections; the plurality of image forming sections form an image on a sheet based on the image data read to the second storage regions, respectively; the second storage sections comprise the first regions adapted to store the image data of the plurality of colors read from the first storage section, respectively; the first region corresponding to one of the colors has the minimum capacity of the first regions; and the first regions corresponding to the others of the colors have different capacities from each other in accordance with differences between an image forming timing corresponding to the one of the colors and image forming timings corresponding to the others of the colors due to differences in the image forming positions, respectively. Accordingly, in consideration of costs, the copy failure is prevented from occurring without increasing the capacities of the second storage sections (page buffers) unnecessarily. Thus, it can be realized to form the image efficiently.

More specifically, even if it takes a long time to read the image data from the first storage section (a storage device such as a hard disk or the like) to the second storage sections (the page buffers) due to the read error or the like, it can be ensured with the minimum capacity that the image data of all colors are stored in the page buffers at a timing when the sheet (paper) is fed. Accordingly, it can be prevented that preparation of the image data (print data) for the image formation lags to generate copy failures such as discharge of a paper erroneously formed (printed) the image or discharge of unwanted white paper.

According to the eighth aspect of the invention, there is provided an image forming apparatus comprising: a first storage section adapted to store image data of a plurality of colors constructing a predetermined color space, respectively; a plurality of second storage sections corresponding to the plurality of colors and having the same capacity, respectively; and a plurality of image forming sections corresponding to the plurality of colors and having different image forming positions from each other, respectively, wherein the image data of each of colors is read from the first storage section to each of second storage sections; the plurality of image forming sections form an image on a sheet based on the image data read to the second storage regions, respectively; the second storage sections have first regions adapted to store the image data of the plurality of colors read from the first storage section, respectively; the first region corresponding to one of the colors has the minimum capacity of the first regions; and the first regions corresponding to the others of the colors have different capacities from each other in accordance with differences between an image forming timing corresponding to the one of the colors and image forming timings corresponding to the others of the colors due to differences in the image forming positions, respectively. Accordingly, it can be prevented that preparation of the image data (print data) for the image formation lags to generate copy failures such as discharge of a paper erroneously formed (printed) the image or discharge of unwanted white paper. Furthermore, the second storage sections (the page buffers) corresponding to the plurality of colors have the same capacity, which is the minimum capacity, and whereby management cost on manufacturing can be reduced remarkably in comparison with a case of using second storage sections (print buffers) having different capacities from colors.

According to the fourteenth aspect of the invention, an image forming apparatus comprises a first storage section adapted to store image data of a plurality of colors constructing a predetermined color space, respectively; a plurality of second storage sections corresponding to the plurality of colors, respectively; aplurality of image forming sections corresponding to the plurality of colors and having different image forming positions from each other; and a print control section adapted to control each of second storage sections to store a predetermined amount of the image data of each color and control each of image forming section to start forming an image thereafter, wherein the image data of each of color are read from the first storage section to each of second storage sections; and the plurality of image forming sections form the image on a sheet based on the image data read to the second storage regions, respectively. Accordingly, lags in preparing the image data (print data) for the image formation can be prevented to avoid copy failures, such as discharge of a paper erroneously formed (printed) the image or discharge of unwanted white paper.

According to the seventeenth aspect of the invention, there is provided an image forming apparatus comprising: a first storage section adapted to store image data of a plurality of colors constructing a predetermined color space, respectively; a plurality of second storage sections corresponding to the plurality of colors to which the image data of the plurality of colors are read from the first storage section, respectively; a plurality of image forming sections corresponding to the plurality of colors and having different image forming positions from each other; a detecting section adapted to detect amounts of the image data stored in the second storage sections; and a paper feeding stop section adapted to stop paper feeding of a sheet when at least one of the amounts of the image data detected by the detecting section falls below a predetermined amount, wherein the plurality of image forming sections form an image on the sheet based on the image data read to the second storage regions, respectively. Accordingly, in consideration of costs, the copy failure is prevented from occurring without increasing the capacities of the second storage sections (page buffers) unnecessarily. Thus, it can be realized to form the image efficiently. Even if it takes a long time to read the image data from the first storage section (a storage device such as a hard disk or the like) to the second storage sections (the page buffers) due to the read error or the like, it can be ensured with the minimum capacity that the image data of all colors are stored in the page buffers at a timing when the sheet (paper) is fed. Accordingly, it can be prevented that preparation of the image data (print data) for the image formation lags to generate copy failures such as discharge of a paper erroneously formed (printed) the image or discharge of unwanted white paper.

What is claimed is:

1. An image forming apparatus comprising:
    a first storage section adapted to store image data of a plurality of colors constructing a predetermined color space, respectively;
    a plurality of second storage sections corresponding to the plurality of colors, respectively, and having different capacities from each other;
    a plurality of image forming sections corresponding to the plurality of colors, respectively and having different image forming positions from each other;
    a plurality of photosensitive drums corresponding to the plurality of colors; and
    a plurality of light emitting sections each of which forms an electrostatic latent image on the photosensitive drum,
    wherein the image data of each color of the plurality of colors are read from the first storage section to each of the second storage sections;
    the first storage section includes a hard disk drive; and
    the plurality of image forming sections form an image on a sheet based on the image data read to the second storage sections, respectively.

2. The image forming apparatus according to claim 1, wherein the second storage sections comprise the first regions adapted to store the image data of the plurality of colors read from the first storage section, respectively;
    the first region corresponding to one of the colors has the minimum capacity of the first regions; and
    the first regions corresponding to the others of the colors have different capacities from each other in accordance with differences between an image forming timing corresponding to the one of the colors and image forming timings corresponding to the others of the colors due to differences in the image forming positions, respectively.

3. The image forming apparatus according to claim 2, wherein the second storage sections further comprise second regions adapted to store the image data read from the first storage section, respectively; and
    each of second regions has capacity enabling to store at least a predetermined amount.

4. The image forming apparatus according to claim 3, wherein the predetermined amount is an amount of image data corresponding to one page of the maximum size of the image formed by the image forming sections.

5. The image forming apparatus according to claim 3, wherein the predetermined amount is an amount of image data corresponding to two pages of the maximum size of the image formed by the image forming sections.

6. The image forming apparatus according to claim 3, wherein the predetermined amount is sum of an amount of image data corresponding to a front surface of a sheet and an amount of image data corresponding to a back surface of the sheet in case of double-sided printing.

7. The image forming apparatus according to claim 4, further comprising an image reading section adapted to read an original to acquire the image data of the plurality of colors,
    wherein the image data of each color acquired by the image reading section are stored in the first storage section through each of the second storage sections, respectively;
    each of the second storage sections further comprises a third region adapted to store the image data of each color acquired by the image reading section; and
    each of the third regions has a capacity enabling to store at least another predetermined amount.

8. The image forming apparatus according to claim 7, wherein the another predetermined amount is an amount of image data corresponding to one page.

9. An image forming apparatus comprising:
    a first storage section adapted to store image data of a plurality of colors constructing a predetermined color space, respectively;
    a plurality of second storage sections corresponding to the plurality of colors and having the same capacity, respectively;
    a plurality of image forming sections corresponding to the plurality of colors and having different image forming positions from each other, respectively;
    a plurality of photosensitive drums corresponding to the plurality of colors; and
    a plurality of light emitting sections each of which forms an electrostatic latent image on the photosensitive drum,
    wherein the image data of each color of the plurality of colors are read from the first storage section to each of the second storage sections;
    the first storage section includes a hard disk drive;
    the plurality of image forming sections form an image on a sheet based on the image data read to the second storage sections, respectively;
    the second storage sections have first regions adapted to store the image data of the plurality of colors read from the first storage section, respectively;
    the first region corresponding to one of the colors has the minimum capacity of the first regions; and
    the first regions corresponding to the others of the colors have different capacities from each other in accordance with differences between an image forming timing corresponding to the one of the colors and image forming timings corresponding to the others of the colors due to differences in the image forming positions, respectively.

10. The image forming apparatus according to claim 9, wherein remaining capacity of the second storage section including the first region corresponding to the one of the colors and having the minimum capacity is used for another application.

11. The image forming apparatus according to claim 10, further comprising:
    an image reading section adapted to read an original to acquire the image data of the plurality of colors; and
    a communication section adapted to transmit the image data of the plurality of colors acquired by the image reading section through a network,
    wherein the another application is at least one of storing the image data acquired by the image reading section until the image data acquired by the image reading section are transmitted by the communication section and storing the image data read from the first storage section.

12. The image forming apparatus according to claim 10, further comprising:
an image reading section adapted to read an original to acquire the image data of the plurality of colors; and
a communication section adapted to transmit the image data of the plurality of colors acquired by the image reading section through a network,
wherein the first storage sections store the image data acquired by the image reading section until the image data acquired by the image reading section are transmitted by the communication section.

13. The image forming apparatus according to claim 9, wherein the second storage sections further comprise second regions having capacities enabling to store at least a predetermined amount, respectively.

14. The image forming apparatus according to claim 13, wherein the predetermined amount is an amount of image data corresponding to one page of the maximum size of the image formed by the image forming sections.

15. The image forming apparatus according to claim 13, wherein the predetermined amount is an amount of image data corresponding to two pages of the maximum size of the image formed by the image forming sections.

16. An image forming apparatus comprising:
a first storage section adapted to store image data of a plurality of colors constructing a predetermined color space, respectively;
a plurality of second storage sections corresponding to the plurality of colors, respectively;
a plurality of image forming sections corresponding to the plurality of colors and having different image forming positions from each other; and
a print control section adapted to control each of the second storage sections to store a predetermined amount of the image data of each color of the plurality of colors and control each of image forming section to start forming an image thereafter,
wherein the image data of each color are read from the first storage section to each of the second storage sections;
the plurality of image forming sections form the image on a sheet based on the image data read to the second storage sections, respectively;
the predetermined amount changes in accordance with at least one of a print type and an output mode; and
the predetermined amount corresponds to a time from a time when the sheet is fed to a time when the image to be formed on the sheet is formed on the sheet.

17. An image forming apparatus comprising:
a first storage section adapted to store image data of a plurality of colors constructing a predetermined color space, respectively;
a plurality of second storage sections corresponding to the plurality of colors to which the image data of the plurality of colors are read from the first storage section, respectively;
a plurality of image forming sections corresponding to the plurality of colors and having different image forming positions from each other;
a plurality of detecting sections adapted to detect amounts of the image data stored in the second storage sections, respectively; and
a paper feeding stop section adapted to stop paper feeding of a sheet when at least one of the amounts of the image data detected by the detecting section falls below a predetermined amount,
wherein the plurality of image forming sections form an image on the sheet based on the image data read to the second storage sections, respectively.

18. The image forming apparatus according to claim 17, further comprising:
a plurality of count sections; and
a notifying section,
wherein when at least one of the amounts of the image data stored in the second storage sections falls below a monitoring amount larger than the predetermined amount, the count sections count the number of times of reading the image data of which amount falls below the monitoring amount to the second storage section; and
when the number of times of reading counted by the count sections exceeds a predetermined number of times, the notifying section notifies the number of the times of reading to a management center through a communication circuit in accordance with the number of times of reading.

19. The image forming apparatus according to claim 17, wherein the predetermined amount is an amount of image data corresponding to one page of the maximum size of the image formed by the image forming sections.

20. The image forming apparatus according to claim 17, wherein the predetermined amount is an amount of image data to be printed on the sheet which has already been fed.

21. The image forming apparatus according to claim 17, wherein the predetermined amount changes in accordance with a print type and a output mode depending on presence of an optional device.

22. The image forming apparatus according to claim 1, wherein the color space is constituted of at least four colors, YMCK; and
the plurality of image forming sections make up a quartet tandem type of image forming section having different image forming positions from each other in correspondence with the four colors.

23. The image forming apparatus according to claim 17, wherein the color space is constituted of at least four colors, YMCK; and
the plurality of image forming sections make up quartet tandem type having different image forming positions from each other in correspondence with the four colors.

* * * * *